US012094621B2

(12) United States Patent
Braun et al.

(10) Patent No.: US 12,094,621 B2
(45) Date of Patent: Sep. 17, 2024

(54) SYSTEM COMPRISING AN APERTURE AND A DISPERSING ELEMENT FOR APPLYING ELECTROMAGNETIC RADIATION ONTO A SOURCE MATERIAL, AND METHOD FOR ALIGNING AN APERTURE

(71) Applicant: MAX-PLANCK-GESELLSCHAFT ZUR FÖRDERUNG DER WISSENSCHAFTEN E.V., Munich (DE)

(72) Inventors: Wolfgang Braun, Bietigheim-Biss (DE); Robin Wanke, Stuttgart (DE)

(73) Assignee: Max-Planck-Gesellschaft, Zur Förderung Der Wissenschaften E.V., Munich (DE)

( * ) Notice: Subject to any disclaimer, the term of this patent is extended or adjusted under 35 U.S.C. 154(b) by 0 days.

(21) Appl. No.: 17/642,015

(22) PCT Filed: Sep. 11, 2019

(86) PCT No.: PCT/EP2019/074253

§ 371 (c)(1),
(2) Date: Mar. 10, 2022

(87) PCT Pub. No.: WO2021/047773

PCT Pub. Date: Mar. 18, 2021

(65) Prior Publication Data

US 2024/0047092 A1 Feb. 8, 2024

(51) Int. Cl.
*G21K 1/02* (2006.01)
*G21K 1/04* (2006.01)
*G21K 1/06* (2006.01)

(52) U.S. Cl.
CPC ............... *G21K 1/02* (2013.01); *G21K 1/043* (2013.01); *G21K 1/046* (2013.01); *G21K 1/067* (2013.01)

(58) Field of Classification Search
CPC ............ G21K 1/02; G21K 1/04; G21K 1/043; G21K 1/046; G21K 1/067
See application file for complete search history.

(56) References Cited

U.S. PATENT DOCUMENTS 7,169,470 B2 * 1/2007 Wolff .................... C03C 13/046 428/375
8,687,286 B2 * 4/2014 Palumbo ............. G02B 19/008 359/709

(Continued)

FOREIGN PATENT DOCUMENTS

JP 2007197235 A 8/2007
WO 2005098483 A1 10/2005

OTHER PUBLICATIONS

An English translation of JP2007197235A by Patent Translate. (Year: 2024).*

(Continued)

*Primary Examiner* — Allen C. Ho
(74) *Attorney, Agent, or Firm* — Dickinson Wright PLLC

(57) ABSTRACT

The present invention relates to an aperture (10) for electromagnetic radiation (100), preferably electromagnetic radiation (100) comprising a wavelength between 1 nm and 20 μm, comprising an aperture body (20) made of a body material (22) transparent for the electromagnetic radiation (100). Further, the present invention relates to a method for aligning an aperture (10), and additionally to a system (70) for applying electromagnetic radiation (100) onto a source material and a dispersing element (90) for such a system (70).

25 Claims, 14 Drawing Sheets

(56) References Cited

U.S. PATENT DOCUMENTS

Figure 1:
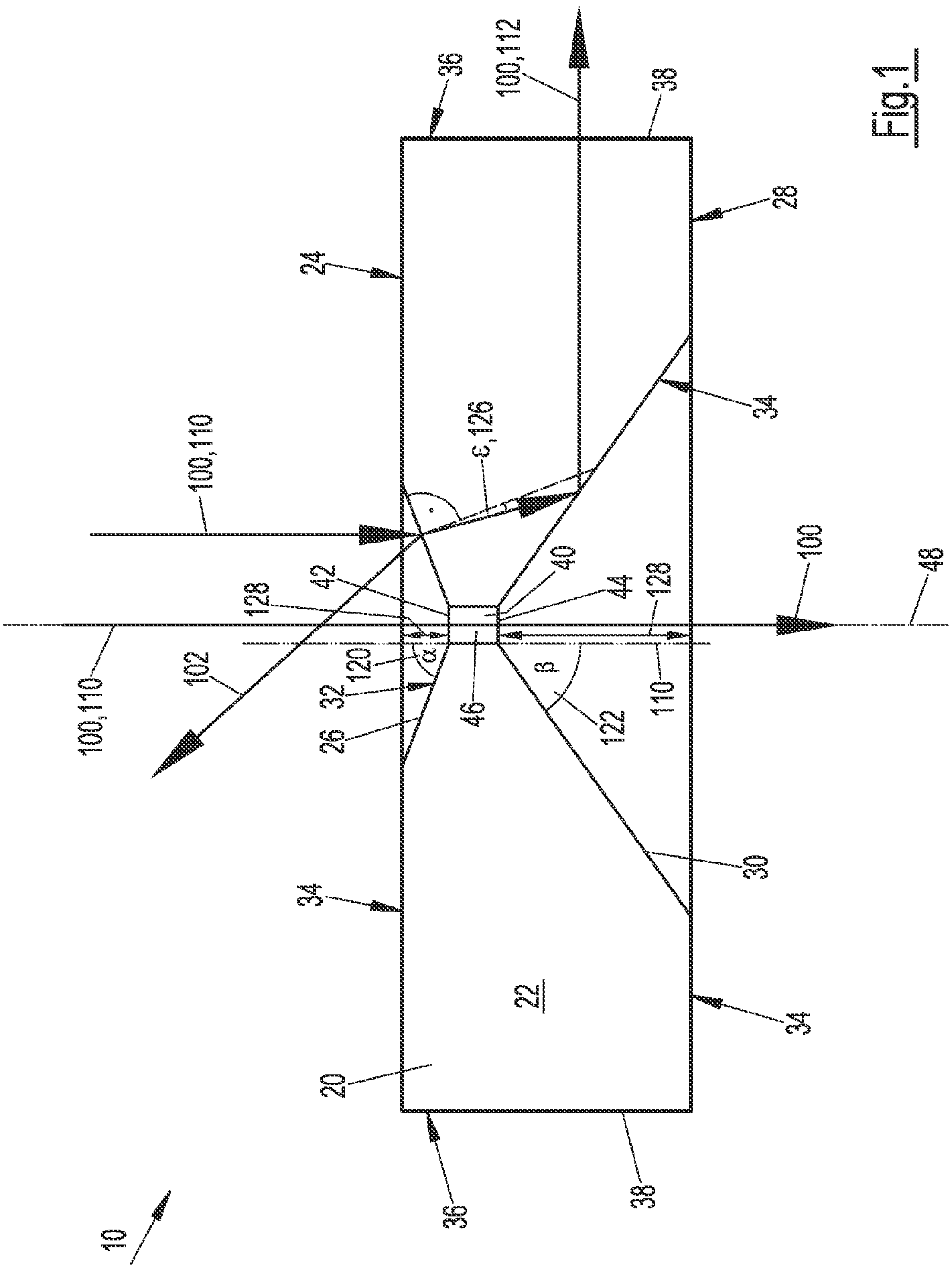

| | | | | |
|---|---|---|---|---|
| 9,102,007 | B2 * | 8/2015 | Hosseini | C03C 14/002 |
| 9,931,695 | B2 * | 4/2018 | Lacy | B23K 35/304 |
| 10,481,093 | B2 * | 11/2019 | Mueller | G01N 21/645 |
| 10,816,466 | B2 * | 10/2020 | Pollard | G01N 21/03 |
| 2004/0220038 | A1 | 11/2004 | Wolff et al. | |
| 2018/0178288 | A1 | 6/2018 | Lacy et al. | |

OTHER PUBLICATIONS

Invitation to Pay Additional Fees with Partial Search Report mailed Apr. 24, 2020 for International Application No. PCT/EP2019/074253, 22 pages.

* cited by examiner

SYSTEM COMPRISING AN APERTURE AND A DISPERSING ELEMENT FOR APPLYING ELECTROMAGNETIC RADIATION ONTO A SOURCE MATERIAL, AND METHOD FOR ALIGNING AN APERTURE

CROSS-REFERENCES TO RELATED APPLICATIONS

This application is a 371 National Phase Application of Patent Application PCT/EP2019/074253, filed on Sep. 11, 2019, which is incorporated herein by reference, in its entirety.

The present invention relates to an aperture for electromagnetic radiation, preferably electromagnetic radiation comprising a wavelength between 1 nm and 20 μm, comprising an aperture body made of body material transparent for the electromagnetic radiation. Further the present invention relates to a method for aligning an aperture, and additionally to a system for applying electromagnetic radiation onto a source material and a dispersing element for such a system.

A deposition of a source material to a target material in thin deposition layers is a technique widely used in modern technology, for instance in the production of specialized semiconductors for electronic elements. To provide an evaporation and/or sublimation of source material, it is possible to use electromagnetic radiation, for instance provided by a laser beam, directed onto the source material. To control the deposition procedure, it is of advantage to collimate the electromagnetic radiation used in the system. Further on, as for the evaporation and/or sublimation of the source material often a high energy density of the electromagnetic radiation is necessary, the energy deposition into the used collimators and/or apertures has to be minimized to ensure a long lifetime of the used equipment. In addition, also electromagnetic radiation not used for the evaporation and/or sublimation has to be absorbed somewhere in the system. This can lead to problems due to the aforementioned high energy density of the electromagnetic radiation and the resulting energy deposit into structures of the system.

In view of the above, it is an object of the present invention, to provide an improved aperture for electromagnetic radiation, an improved method for aligning an aperture, an improved system for applying electromagnetic radiation onto a source material and an improved dispersing element for such a system, which do not have the aforementioned drawbacks of the state of the art. In particular it is an object of the present invention to provide an aperture, a method for aligning an aperture, a system and a dispersing element which allow controlling an energy deposit into the elements of the system in an especially easy and cost-efficient way.

This object is satisfied by the patent claims. In particular, this object is satisfied by an aperture for electromagnetic radiation according to claim 1, by a method for aligning an aperture according to claim 26, by a system for applying electromagnetic radiation onto a source material according to claim 28 and by a dispersing element for such a system according to claim 32. The dependent claims describe preferred embodiments of the invention. Details and advantages described with respect to an aperture according to the first object of the invention also refers to a method according to the second aspect of the invention, to a system according to the third aspect of the invention and to a dispersing element according to the fourth aspect of the invention and vice versa, if of technical sense.

According to a first aspect of the invention, the object is satisfied by an aperture for electromagnetic radiation, preferably electromagnetic radiation comprising a wavelength between 1 nm and 20 μm, comprising an aperture body made of a body material transparent for the electromagnetic radiation, the aperture body limited with respect to an impinging direction of the electromagnetic radiation by a facing surface facing the electromagnetic radiation and an averted surface opposite to the facing surface, wherein the aperture body comprises an aperture opening continuously extending between a facing orifice in the facing surface and an averted orifice in the averted surface, and wherein the facing orifice is surrounded by a refraction section, the refraction section being inclined inward with respect to the facing surface into the aperture body by an angle $\alpha$ with respect to the impinging direction, and wherein the averted orifice is surrounded by a reflection section, the reflection section being inclined inward with respect to the averted surface into the aperture body by an angle $\beta$ with respect to the impinging direction.

An aperture according to the present invention is intended but not limited for a use in a system, in which electromagnetic radiation is applied onto a source material to evaporate and/or sublimate source material. The aperture according to the invention can be used to define the beam of electromagnetic radiation, especially the size of the beam perpendicular to its impinging direction. Preferably, the aperture according to the invention is adapted for an electromagnetic radiation comprising a wavelength between 1 nm and 20 μm, in particular a laser beam.

Especially, an aperture according to the present invention comprises an aperture body, in which an aperture opening is arranged. The aperture body comprises a facing surface, in particular a planar facing surface, facing the electromagnetic radiation and on its opposite side an averted surface, in particular a planar averted surface. In particular, the facing surface and the averted surface can be parallel to each other and are preferably aligned perpendicular to the impinging direction of the electromagnetic radiation. The electromagnetic radiation can traverse the aperture body unhindered through the aperture opening, which extends between a facing orifice in the facing surface and an averted orifice in the averted surface, wherein besides the aperture opening the electromagnetic radiation impinges on the aperture body. In other words, an aperture according to the present invention allows defining a lateral size of the beam of the electromagnetic radiation perpendicular to its impinging direction.

To eliminate or at least minimize an energy deposit of the electromagnetic radiation into the aperture body, the aperture body is made of a body material transparent at least for the respective electromagnetic radiation. In other words, electromagnetic radiation impinging on the aperture body beyond the aperture opening is not absorbed by the body material of the aperture body but can penetrate into the aperture body.

According to the present invention, especially areas surrounding the facing orifice and the averted orifice in the facing surface and the averted surface, respectively, comprise a specific shape. In particular, the facing orifice is surrounded by a refraction section, whereby the refraction section is inclined inward with respect to the facing surface into the aperture body by an angle $\alpha$ with respect to the impinging direction.

In other words, the electromagnetic radiation impinging on the facing surface in the impinging direction impinges onto the facing surface, especially the refraction section, in an angle smaller than 90°. As the aperture body is transparent to the electromagnetic radiation, the electromagnetic radiation is refracted into the body material of the aperture body. In addition, by the inclination of the refraction section with respect to the impinging direction, electromagnetic radiation reflected on the refraction section is pointed away from the original impinging direction. Back-scattering of electromagnetic radiation into its source can therefore be prohibited.

On the other side of the aperture body, the averted orifice is surrounded by a reflection section inclined similarly inward with respect to the averted surface into the aperture body by an angle β with respect to the original impinging direction of the electromagnetic radiation. The electromagnetic radiation refracted on the refraction section travels within the body material of the aperture body and reaches the reflection section of the averted surface of the aperture body. On this reflection section, the refracted electromagnetic radiation is at least partly internally reflected within the body material. Due to the inclination of the reflection section, this internal reflection of the electromagnetic radiation within the body material of the aperture body directs the reflected beam of electromagnetic radiation away from the original impinging direction of the electromagnetic radiation. In other words, electromagnetic radiation impinging on an aperture according to the invention can unhinderedly travel through the aperture via the aperture opening, wherein electromagnetic radiation impinging on the aperture body itself is refracted into the body material of the aperture body and subsequently internally reflected on the reflection section of the averted surface away from the original impinging direction. An especially effective forming of the beam of the electromagnetic radiation of the aperture according to the invention can therefore be provided. In addition, the electromagnetic radiation besides the central beam is guided away from the original impinging direction and can be absorbed somewhere else, preferably in suitable deposition areas.

Further, an aperture according to the invention can be characterized in that the angle α and/or the angle β are larger than 45° and smaller than 90°. For the angle α this range between 45° and 90° is especially suitable to ensure that electromagnetic radiation nevertheless reflected on the refraction surface is not scattered back to the source of the electromagnetic radiation, as already mentioned above. On the other hand for the angle β a range between 45° and 90° is especially suitable to ensure that a reflection, especially an internal reflection, at the reflection section is effectively directed in a large angle away from the original impinging direction of the electromagnetic radiation. An improved separation of the unhindered electromagnetic radiation going through the aperture opening and the remaining electromagnetic radiation impinging somewhere on the aperture body can therefore be provided.

Preferably, according to an embodiment of an aperture according to the present invention, the angle α and the angle β are of the same size. For instance, this allows using the same grinding tool to provide both the refraction section in the facing surface and the reflection section in the averted surface. The production of an aperture according to the invention can therefore be provided more easily.

In particular, an aperture according to the present invention can comprise that the angle α and the angle β are adapted such that an electromagnetic radiation refracted into the aperture body through the refraction section is internally totally reflected on the reflection section. In other words, the angle α and the angle β are chosen such that on the reflection section no electromagnetic radiation is transmitted but all electromagnetic radiation is internally reflected on this reflection section. This can especially be provided for an electromagnetic radiation with a particular wavelength. An even better definition of the beam of electromagnetic radiation collimated by an aperture according to the invention can therefore be provided.

Further, an aperture according to the invention can be improved in that the electromagnetic radiation internally totally reflected on the reflection section comprises a reflection direction at least essentially perpendicular to the impinging direction. In other words, the electromagnetic radiation internally reflected in the aperture body on the reflection section travels perpendicular to the original impinging direction and hence also perpendicular to the direction of the electromagnetic radiation going through the aperture opening. The internally reflected electromagnetic radiation with the reflection direction leaves the aperture body therefore in a maximum angular direction difference from the aperture opening.

According to an embodiment of an aperture according to the invention, the aperture comprises that the reflection section is shaped as a circular area around the facing orifice and/or the reflection section is shaped as a circular area around the averted orifice. Especially, both the circular area of the refraction section and the circular area of the reflection section can be centered on a center of the aperture opening. In other words, such a circular area has the same radial elongation in all directions around the respective opening. Predominant directions in a specific angle around the aperture opening for the refraction section and/or the reflection section can therefore be prohibited.

In a further improvement of an aperture according to the invention, the refraction section and/or the reflection section are shaped as truncated cones. In other words, the angle α and/or the angle β, respectively, are constant throughout the whole refraction section and/or the reflection section, both axially and radially with respect to the center of the aperture opening. Manufacturing of an aperture according to the invention can therefore be provided in an easier way.

Additionally, an aperture according to the invention can be improved by that the opening angle α and a cone height of the refraction section along the impinging direction and the opening angle β and a cone height of the reflection section along the impinging direction are chosen such that all electromagnetic radiation refracted at the refraction section is internally totally reflected at the reflection section. In other words, the refraction section and the reflection section as a whole, especially the parameters for the respective truncated cone of both the refraction section and reflection section, are chosen such, that all electromagnetic radiation impinging on and refracted by the refraction section reaches the reflection section, Further, no part of this electromagnetic radiation leaves the aperture body through the reflection section but all such electromagnetic radiation is internally totally reflected at the reflection section. Also, this preferred embodiment of an aperture according to the invention allows an especially good definition of a beam of electromagnetic radiation confined by an aperture according to the invention.

According to a further embodiment of an aperture according to the invention, the aperture opening comprises a cylindrical middle section connecting the facing orifice in the refraction section and the averted orifice in the reflection section, in particular wherein a central axis of the cylindrical middle section is aligned to the impinging direction. In other words, in this embodiment of an aperture according to the invention the facing orifice and the averted orifice are not identical and not arranged in an overlapping way, but spaced apart from each other and connected by the cylindrical middle section, forming the respective ends of the cylindrical middle section. This allows for instance to choose the aforementioned angles α, β and cone heights more freely, as the truncated cones forming the refraction section and reflections section, respectively, no longer have to meet and to be directly connected to each other. An improved adaptation of an aperture according to the invention, for instance with respect to the used electromagnetic radiation and/or the body material of the aperture body, can therefore be provided. In addition, by providing a cylindrical middle section, the respective angle of the edge of the aperture body at the facing orifice and the averted orifice can be enlarged, especially with respect to an embodiment with no middle section, in which the facing orifice and the averted orifice coincide. Hence, in the present embodiment with a cylindrical middle section, heat conduction within the aperture material away from the respective edges is facilitated.

In an alternative embodiment of an aperture according to the invention, the aperture opening comprises a truncated conical middle section connecting the facing orifice in the refraction section and the averted orifice in the reflection section, wherein the averted orifice is larger than the facing orifice, in particular wherein a central axis of the truncated conical middle section is aligned to the impinging direction. In this embodiment of an aperture according to the invention, the middle section connecting the facing orifice and the averted orifice of the aperture opening has the shape of a truncated cone. Especially the cone opens along the impinging direction, whereby the averted orifice is larger than the facing orifice. In this embodiment, especially the facing orifice defines the size of the beam of the electromagnetic radiation confined by the aperture according to the invention. Especially as the truncated conical middle section opens in direction to the averted orifice, an impingement of electromagnetic radiation on a side surface of the conical middle section is prohibited by geometry. An energy deposit into this conical middle section by impinging electromagnetic radiation can therefore be prohibited.

Further an aperture according to the invention can be improved by that the truncated conical middle section comprises an opening angle γ, whereby the opening angle γ is smaller than 90° minus a sum of the opening angle α and an angle ε of electromagnetic radiation refracted at the refraction section. The angle ε is thereby measured between the direction of the refracted electromagnetic radiation and a normal to the surface of the refraction section. Electromagnetic radiation impinging on the refraction section is refracted into the body material of the aperture body. By choosing the opening angle γ of the conical middle section such, that the opening angle γ is smaller than 90° minus a sum of the opening angle α of the refraction section and an angle ε in which the electromagnetic radiation is refracted into the body material of the aperture body at the refraction section, it can be ensured that an internal impingement of the electromagnetic radiation refracted at the refraction section onto a side surface of the truncated conical middle section can be excluded. In other words, the angle ε is chosen such that it is smaller than the angle between the impinging direction and a direction of the refracted electromagnetic radiation within the aperture body. The advantage of facilitated heat conduction away from the respective edges of the aperture body at the facing orifice and the averted orifice, respectively, as described above with respect to a cylindrical middle section can also be provided with a middle section in shape of a truncated cone due to a similar enlargement of the angles at the respective edges.

Additionally, an aperture according to the present invention can be characterized in that at least the refraction section is coated with an anti-reflection coating. In other words, a reflection of impinging electromagnetic radiation onto the refraction section can be diminished, preferably minimized, by this anti-reflection coating. The amount of back scattered electromagnetic radiation from the refraction section can therefore be scaled down.

In another embodiment, the aperture according to the present invention comprises that at least the reflection section, in particular the entire averted surface, preferably also the facing surface except the refraction section, is coated with a total-reflection coating, whereby a refractive index of the totally reflection coating is smaller than the refractive index of the body material. In other words, with this total reflection coating the total reflection, especially at the reflection section but preferably also on the rest of the surfaces of the aperture body except the refraction section, is not based on the refractive index difference between the body material and the surrounding atmosphere but on the difference of the refracting indices of the body material and the total reflection coating. This provides the advantage that an aperture according to the invention can be used independently of the atmosphere present in the system in which the aperture according to the invention is used. In addition, also material deposition on the aperture body during usage, especially deposition of source material evaporated and/or sublimated by the electromagnetic radiation, takes place on the total reflection coating and thereby has no influence on the total reflection within the aperture according to the invention.

Similar advantages can be achieved with a coating with a high index of refraction as for instance a metallic coating, so that reflection occurs at the interface between the aperture body and the preferably metallic coating. This coating with a high index of refraction can also be arranged at the reflection section, in particular at the entire averted surface, preferably also at the facing surface except the refraction section. Although this metallic coating absorbs the electromagnetic radiation, it is possible to choose a coating material with low absorption at the wavelength if the incident electromagnetic radiation such as silver (Ag). Especially the advantages of a prevention of a higher absorption and/or change in absorption over time, respectively, due to a subsequent deposition of evaporated and/or sublimated source material can also be provided with such a coating with a high index of refraction.

Alternatively or additionally an aperture according to the invention can be characterized in that a shielding aperture, in particular an opaque shielding aperture, with a central opening is arranged at the averted surface, the central opening comprises at least the size of the facing orifice and is aligned to the aperture opening of the aperture body. In other words, in this embodiment of an aperture according to the invention with respect to the impinging direction after the aperture an additional shielding aperture is arranged. Source material evaporated and/or sublimated by the electromagnetic radiation is therefore deposited on the shielding aperture and cannot reach the aperture body of the aperture according to the invention. An influence of deposited source material, especially on the ability of the aperture according to the invention to internally totally reflect electromagnetic radiation, can therefore be prohibited.

Further, an aperture according to the present invention can be characterized in that the aperture body comprises an exit surface connecting the facing surface and the averted surface spaced to the aperture opening, wherein the exit surface comprises a concave and/or convex shape for a dispersive outcoupling of the electromagnetic radiation out of the aperture body. As described above, electromagnetic radiation entering the aperture body, preferably through the reflection section, is essentially totally reflected within the aperture body and guided away from the aperture opening. Preferably at an outer rim of the aperture body this electromagnetic radiation reaches the exit surface of the aperture body and is coupled out of the aperture body. Especially, this exit surface comprises a concave and/or convex shape and therefore the respective outcoupling of the electromagnetic radiation out of the aperture body is a dispersive one. This allows spreading the electromagnetic radiation coupled out of the aperture body onto a larger area and therefore the spatial energy density of the electromagnetic radiation is diminished. Damage caused by this electromagnetic radiation can therefore be prohibited and/or the energy deposited by the electromagnetic radiation can be removed more easily.

In particular, an aperture according to the invention can be characterized in that the aperture body is made of sapphire. Sapphire as body material is durable and transparent for a wide range of possible electromagnetic radiations. Further, sapphire has a high melting point and therefore can absorb heat deposited by the electromagnetic radiation, for instance at its exit surface without losing its geometrical form.

In addition, an aperture according to the present invention can comprise that the aperture body is adapted for a laser as electromagnetic radiation, especially an infrared or visible laser, in particular a laser with a wavelength of 1030 nm, 515 nm or 450 nm. Lasers as electromagnetic radiations comprise especially the advantage that the impinging direction of the electromagnetic radiation can be defined very precisely. Further in most of the cases lasers are monochromatic and therefore the geometrical constraints for the total internal reflection of the electromagnetic radiation refracted into the aperture body can be fulfilled more easily.

In particular, an aperture according to the invention can be characterized in that the aperture comprises a holding structure for an arrangement of the aperture body in a path of the electromagnetic radiation within a vacuum vessel, especially within an aperture feedthrough in a cooling shroud of the vacuum vessel. In other words, this holding structure allows a placement and/or arrangement of the aperture with respect to the impinging electromagnetic radiation. In particular, the holding structure can provide a reversible arrangement of the aperture according to the present invention in the respective aperture feedthrough. When used in a system, especially for directing electromagnetic radiation onto a source material, this can preferably be provided within an aperture feedthrough in a cooling shroud of a vacuum vessel. Electromagnetic radiation impinging on the refraction section and therefore guided away from the impinging direction can be directed in direction of the cooling shroud and therefore the energy deposited by this unused electromagnetic radiation can be absorbed in the cooling shroud.

Especially, the aperture according to the present invention can be improved by that that the holding structure arranges the aperture body within the vacuum vessel between a coupling window for coupling the electromagnetic radiation into the vacuum vessel and a radiation target within the vacuum vessel on which the electromagnetic radiation is directed, whereby the aperture, in particular the aperture body, comprises a size perpendicular to the impinging direction of the electromagnetic radiation such that the aperture, in particular the aperture body, covers at least a solid angle of the coupling window as seen from the radiation target. In other words, the aperture is arranged within the vacuum vessel in the path of the electromagnetic radiation along the impinging direction somewhere between the coupling window, at which the electromagnetic radiation is coupled into and enters the vacuum vessel, and the radiation target, on which the electromagnetic radiation is directed. Preferably, a radiation target can be a source material provided in a source holder which is to be evaporated and/or sublimated by an energy deposit of the electromagnetic radiation. In particular, a size of the aperture, especially of the aperture body, is chosen such that a solid angle of the radiation window as seen from the radiation target is completely covered by the aperture when the aperture is arranged within the vacuum vessel. In other words, neither electromagnetic radiation scattered back at the radiation target against the impinging direction, nor source material evaporated and/or sublimated by the impinging electromagnetic radiation can reach the coupling window as both the electromagnetic radiation and the evaporated and/or sublimated material, respectively, are stopped by the aperture. Hereby the tiny fraction of radiation and/or material passing through the aperture opening can be neglected. In summary, an extensive protection of the coupling window, especially against coating by evaporated and/or sublimated material within the vacuum vessel can be provided.

In a preferred embodiment of an aperture according to the invention, the holding structure comprises two or more reception sections, in particular metal reception sections, in direct contact to an outer rim of the aperture body for fixing the aperture body within the holding structure. These reception sections are located at the outer rim of the aperture body and hence at the exit surface of the aperture body.

Electromagnetic radiation totally reflected within the aperture body is therefore directed to these reception sections and, especially if the reception sections are metal reception sections, absorbed by the reception sections. By surveying these reception sections, for instance by measuring the temperature of these reception sections, the amount of absorbed electromagnetic radiation by the respective reception section can be determined. Differences between the at least two reception sections with respect to the determined absorbed electromagnetic radiation can be used to determine an alignment of the aperture according to the invention with respect to the impinging electromagnetic radiation.

An aperture according to the invention can be further improved by that the two or more reception sections are equally distributed along the outer rim of the aperture body and/or are arranged equally distanced to the aperture opening. In other words, the two or more reception sections are arranged such at the aperture body that a comparison of the determined amount of absorbed electromagnetic radiation in the respective reception sections directly allow a determination of a correct alignment of the aperture opening with respect to the impinging electromagnetic radiation. If the two or more reception sections are equally distributed along the outer rim of the aperture body and are arranged equally distant to the aperture opening this comparison can be provided especially easily, as with a perfectly aligned impinging beam of electromagnetic radiation, the amount of energy deposited in the respective reception sections should be identical.

In addition, an aperture according to the invention can be improved by that the outer rim of the aperture body comprises three or more corners equally distant to the aperture opening and to each other, whereby each of the two or more corners is fixed by a reception section. In other words, the reception sections fix the corners of the aperture body, whereby these corners are equally distanced both to each other and to the aperture opening, respectively. This can be provided for instance by a shape of the aperture body of an equilateral triangle, a square, or any other equilateral polygon. Hence a symmetrical arrangement of the corners with respect to the aperture opening and also of the respective reception sections can be provided especially easily.

Further, an aperture according to the invention can be improved by that the holding structure comprises at least one sensor element to monitor the two or more reception sections. By monitoring the reception sections by a sensor element, the amount of electromagnetic radiation absorbed in the respective reception section can be determined. Out of this determination based on data provided by the sensor element, an alignment of the aperture with respect to the impinging direction of the electromagnetic radiation can be provided.

Especially, an aperture according to the invention can be improved by that the at least one sensor element is a camera and/or temperature detecting device. By measuring the temperature, an amount of absorbed electromagnetic radiation in the respective reception section, which causes a rise of temperature of the respective reception section, can be determined especially easily. Further, if the amount of absorbed electromagnetic radiation is high enough, there will be a visible change of the appearance of the reception section. This can be easily detected by a camera as sensor element. A combination of these two possibilities is an infrared camera, which can already detect shifts in the temperature of the respective reception section by detecting the heat radiation of the respective reception section starting in the infrared part of the electromagnetic spectrum.

In particular, an aperture according to the invention can be characterized in that the holding structure comprises an actuator for a relative placement of the aperture body within the holding structure, in particular based on the monitoring of the two or more reception sections by the at least one sensor element. As described above, by monitoring the two or more reception sections, an alignment of the aperture, especially the aperture body, with respect to the impinging direction of the electromagnetic radiation can be provided. Based on this measurement, the actuator of the holding structure can provide a relative placement of the aperture body, and therefore of the aperture opening, with respect to the impinging direction of the electromagnetic radiation. An alignment of the aperture opening to the impinging electromagnetic radiation, especially for instance to a laser beam, can therefore be provided, preferably constantly be provided, for instance by implementing an open loop control.

According to a second aspect of the invention, the object is satisfied by a method for aligning a suitable aperture according to the first aspect of the invention, wherein a beam of electromagnetic radiation is impinging on the aperture, the method comprising the following steps:

a) Monitoring the two or more reception sections by the at least one sensor element,
b) Comparing the monitoring result for the two or more reception sections determined in step a), and
c) Determining an alignment of the aperture, especially of the aperture opening, with respect to the beam of the electromagnetic radiation based on the result of the comparison in step b).

The method according to the second aspect of the invention is carried out with a suitable aperture according to the first aspect of the invention. Therefore, all advantages described above with respect to the suitable aperture according to the first aspect of the invention can also be achieved by a method for aligning this aperture according to the second aspect of the invention.

In the first step a) of the method according to the second aspect of the invention, the two or more reception sections, which hold the aperture body within the holding structure, are monitored by the at least one sensor element. This allows in the next step b) to compare the data of this monitoring, whereby in particular differences of the monitored data for the two or more reception sections are determined. Based on these differences, an alignment of the aperture is determined in the last step c) of a method according to the second aspect of the invention. Especially an alignment of the aperture opening with respect to the impinging electromagnetic radiation can be determined. In other words, after a completion of the step a), b) and c) of a method according to the invention there is information present about the alignment, in particular of a present misalignment, of the aperture and especially the aperture opening with respect to the impinging electromagnetic radiation.

Further, a method according to the invention can be improved by that the holding structure of the aperture comprises an actuator, wherein the actuator moves the aperture body within the holding structure based on the alignment determined in step c) to center the beam of electromagnetic radiation with respect to the aperture opening. In this additional step an actuator of the holding structure is used to move and actively align the aperture body and thereby especially the aperture opening in the aperture body, with respect to the beam of electromagnetic radiation impinging onto the aperture. An especially good and centered alignment of the aperture body and especially the aperture opening with respect to the beam of electromagnetic radiation can therefore be provided.

According to a third aspect of the invention the object is satisfied by a system for applying electromagnetic radiation onto a source material. The system according to the third aspect of the invention comprises

- a system volume,
- a source holder with a source material arranged in the system volume,
- a source of electromagnetic radiation to be coupled into the system volume for an application onto the source material,
- a cooling shroud surrounding at least parts of the system volume,
- an aperture feedthrough extending through the cooling shroud for coupling of the electromagnetic radiation into the system volume,
- a dispersion feedthrough extending through the cooling shroud for coupling electromagnetic radiation reflected by the source material out of the system volume, wherein the system further comprises an aperture according to the first aspect of the invention arranged in the aperture feedthrough, and further wherein the system comprises a dispersing element arranged in the dispersion feedthrough with a dispersing body for at least partly diverting electromagnetic radiation scattered at the source material in a scattering direction to the cooling shroud.

A system according to the third aspect of the invention comprises an aperture according to the first aspect of the invention. Therefore, all advantages described above with respect to an aperture according to the first aspect of the invention can also be achieved by a system according to the third aspect of the invention. Especially, as the aperture according to the first aspect of the invention is arranged within an aperture feedthrough in a cooling shroud of a system according to the third aspect of the invention, electromagnetic radiation collimated by the aperture is refracted and reflected into the aperture body and led to the cooling shroud, which at least partly surrounds the aperture feedthrough. An energy deposit of this collimated electromagnetic radiation into the coolant of the cooling shroud can therefore be provided especially easily. Additionally, located opposite to the aperture feedthrough in the cooling shroud, also a dispersion feedthrough is arranged and extends through the cooling shroud, whereby the dispersion feedthrough is arranged such that electromagnetic radiation scattered at the source material in a scattering direction reaches this dispersion feedthrough. In the dispersion feedthrough a dispersing element is arranged to disperse this scattered electromagnetic radiation in direction to the cooling shroud. An energy deposit of the scattered electromagnetic radiation into the coolant of the cooling shroud can therefore also be provided especially easily.

In particular, a system according to the invention can comprise that the cooling shroud is adapted to be used with a liquid coolant, in particular water, preferably liquid nitrogen. Liquid coolants, in particular water, preferably liquid nitrogen, are especially suitable because of their high heat capacity and/or low temperature.

Further, the liquid coolant can be pumped through the cooling shroud and therefore an energy deposit from electromagnetic radiation into the cooling shroud can easily be transported out of the system. Constant temperatures of the cooling shroud and therefore also of the system volume can therefore be provided.

According to the fourth aspect of the invention the object is solved by a dispersing element for a system according to the third aspect of the invention, with a dispersing body for at least partly diverting electromagnetic radiation scattered in a scattering direction on the source material by deflection and/or distribution and/or combined absorption and reemission of the electromagnetic radiation. A dispersing element according to the invention is characterized in that the dispersing element comprises an arranging structure for reversible arrangement within the dispersion feedthrough of the cooling shroud. A dispersing element according to the fourth aspect of the invention can be used and is intended for a usage within a system according to the third aspect of the invention. Therefore, all advantages described above with respect to a system according to the third aspect of the invention can also be achieved by a dispersing element according to the fourth aspect of the invention.

Additionally, the dispersing element comprises an arranging structure. Hence, a dispersing element according to the fourth aspect of the invention is reversibly arrangeable within the dispersion feedthrough of the cooling shroud. This allows choosing the most adapted and suitable dispersing element, which comprises the best features for the respective electromagnetic radiation present within the system.

The dispersing element is intended to be arranged within the dispersion feedthrough of the cooling shroud and hence within the system volume. In other words, during operation the dispersing element will be coated with the source material evaporated and/or sublimated by the electromagnetic radiation. This enhances absorption of the electromagnetic radiation scattered at the source material by the dispersion element. The absorbed energy subsequently will be reemitted by the dispersing element, preferably perpendicular to its surface. Consequently, a small angle, in particular smaller 45°, preferably smaller 15°, between the impinging scattered electromagnetic radiation and the surface of the dispersion element is of advantage. On the one hand, scaling down the aforementioned angle allows enlarging the surface area of the dispersing element and hence diminishing the temperature rise of the dispersing element caused by the absorbed electromagnetic radiation. On the other hand, as the absorbed electromagnetic radiation is reemitted mainly perpendicular to the surface of the dispersing element, a reemission of this absorbed electromagnetic radiation back into the system volume in direction of the source holder can be suppressed.

According to an embodiment of a dispersing element according to the invention, the dispersing element comprises that the dispersing body at least essentially fills a cross-section of the dispersing feedthrough perpendicular to the scattering direction of the electromagnetic radiation scattered at the source material. In other words, the cross section of the dispersion feedthrough perpendicular to the scattering direction of the electromagnetic radiation is completely filled by the dispersing body of the dispersing element. Hence no electromagnetic radiation scattered at the source material in the scattering direction can traverse the dispersion feedthrough, as this cross-section is completely filled with the dispersing body, which redirects the electromagnetic radiation in direction of the cooling shroud.

Further, a dispersing element according to the invention can be characterized in that the dispersing body comprises a passage opening, preferably a central passage opening. In other words, through this passage opening electromagnetic radiation can transverse the dispersing body of the dispersing element for further use.

In addition, a dispersing element according to the invention may comprise that the dispersing body is of a conical shape aligned to the scattering direction of the electromagnetic radiation scattered at the source material and points in direction of the source material. In other words, the electromagnetic radiation scattered at the source material in the scattering direction impinges on the dispersion body on its inclined surface area. An especially easy redirection of the electromagnetic radiation scattered at the source material in the scattering direction in direction to the cooling shroud can therefore be provided. To achieve this, the conical shape preferably comprises a small opening angle, in particular smaller 45°, preferably smaller 15°.

According to an alternative embodiment of a dispersing element according to the invention, the dispersion body comprises a flat dispersion surface, especially an elliptical dispersion surface, wherein the dispersion surface is tilted with respect to the scattering direction of the electromagnetic radiation scattered at the source material. In contrast to the aforementioned embodiment, in which the dispersing body is of a conical shape, the dispersing body of the present embodiment comprises a flat dispersion surface. Again, this flat dispersion surface can preferably fill the cross-section of the dispersion feedthrough. As the dispersion surface is flat, the electromagnetic radiation coming from the source material is redirected especially and preferably in the half space defined by the surface of the flat dispersion surface. This allows for instance, redirecting the scattered electromagnetic radiation into a specific part of the cooling shroud if necessary. To achieve this, the angle of the tilt between the scattering direction and the flat dispersion surface is preferably small, in particular smaller 45°, preferably smaller 15°.

Figure 4:
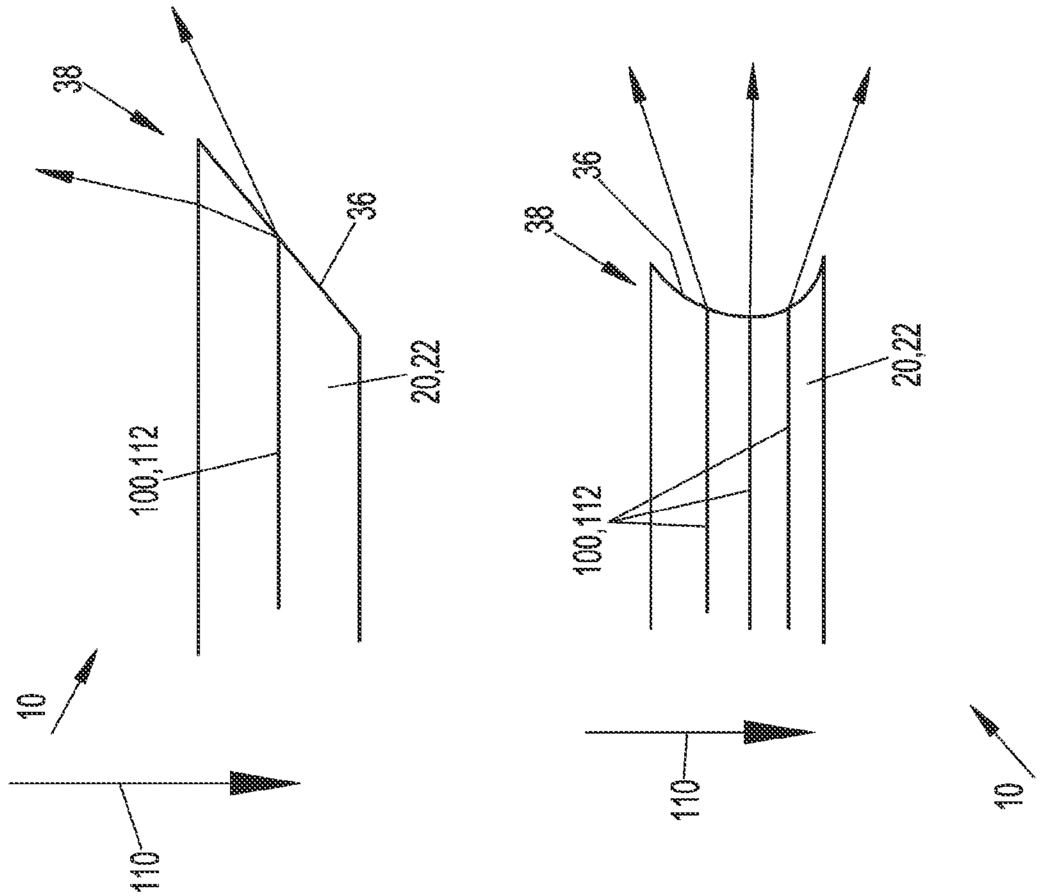
Figure 5:
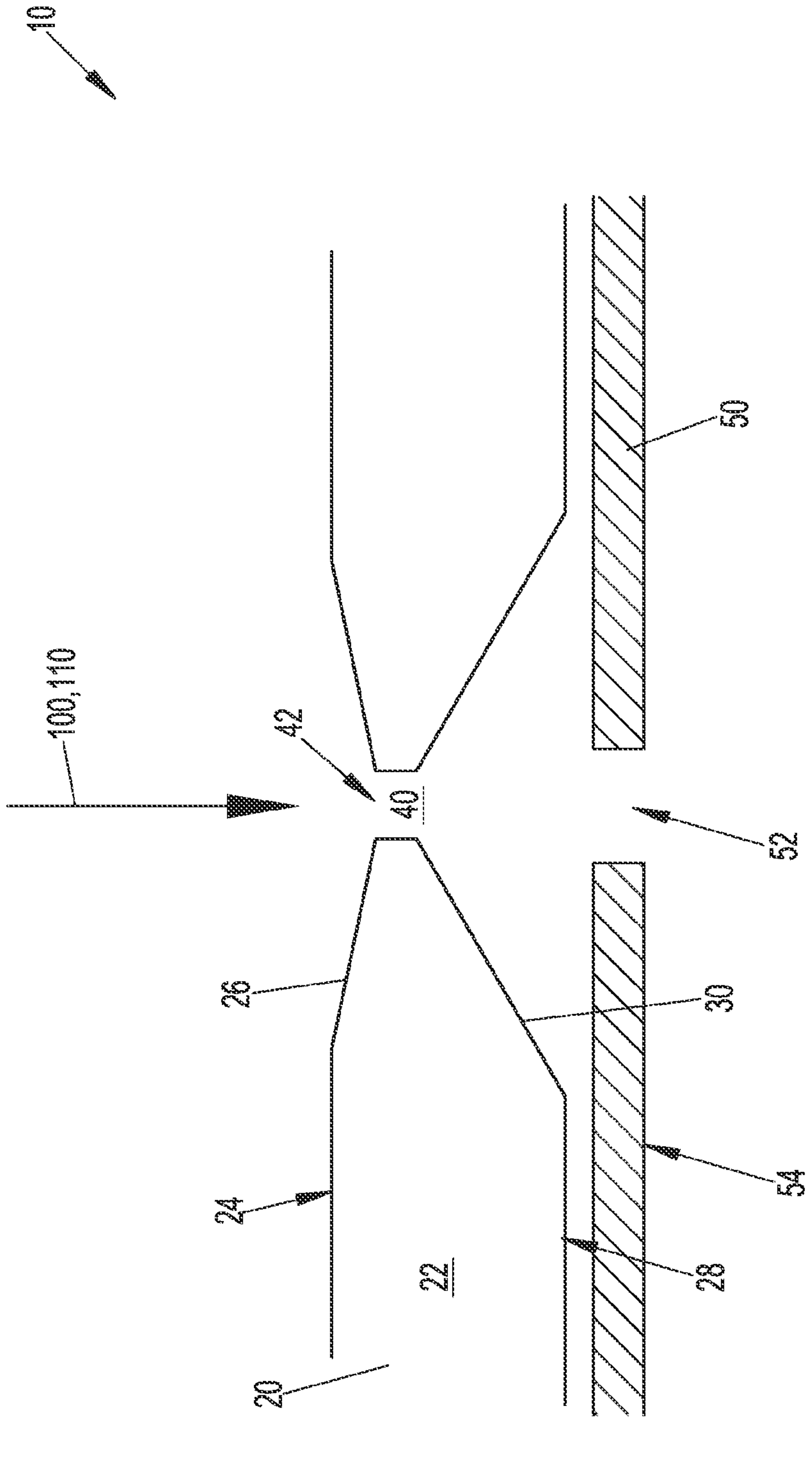
Figure 6:
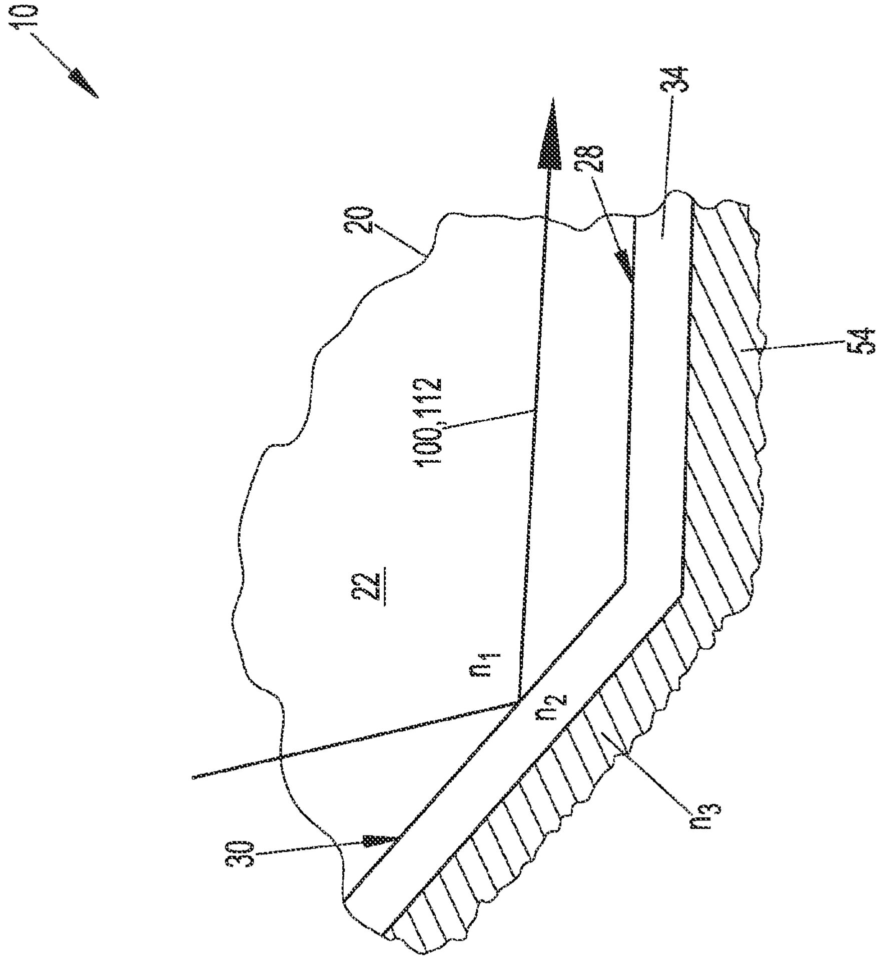
Figure 7:
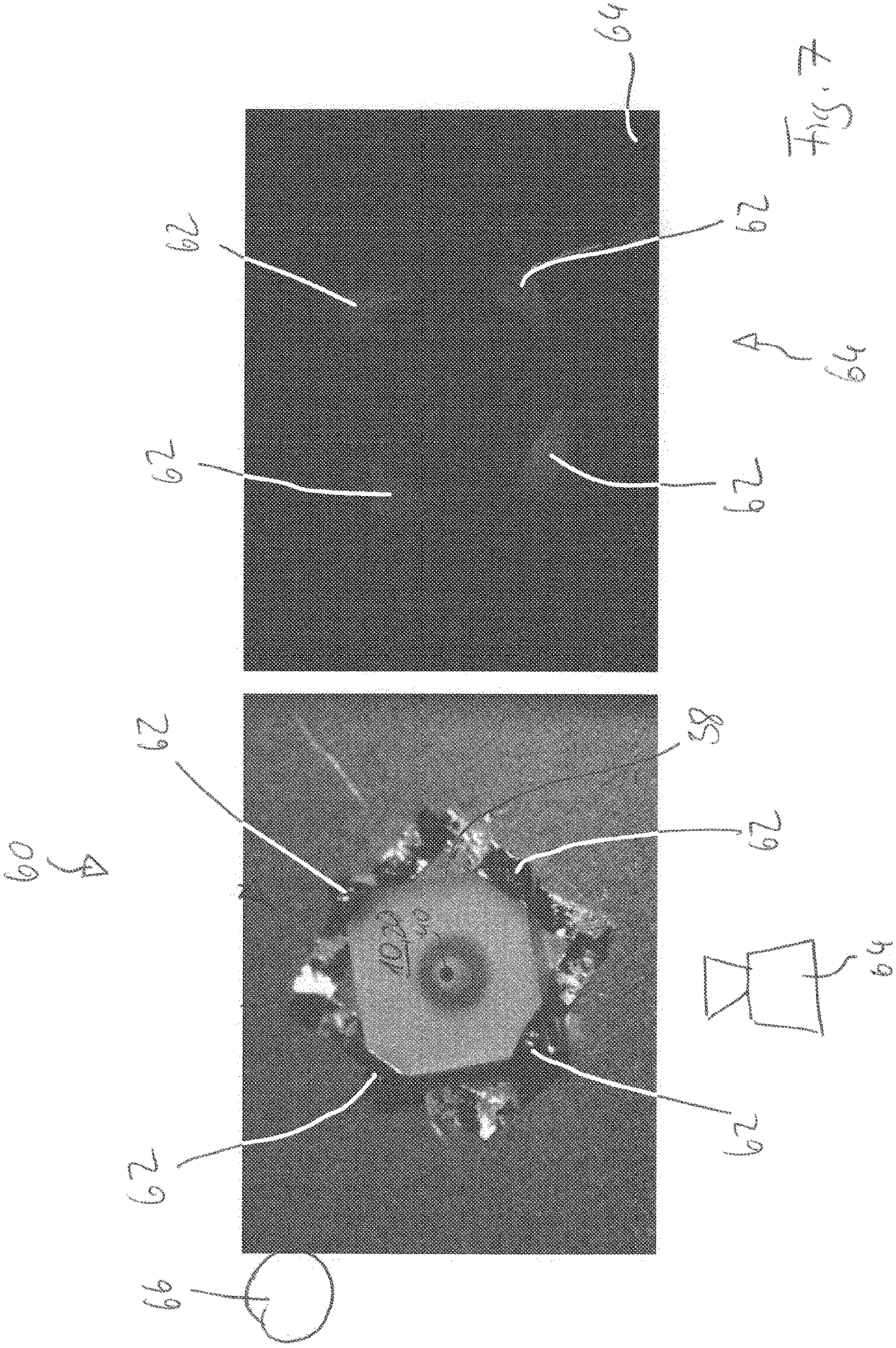
Figure 8:
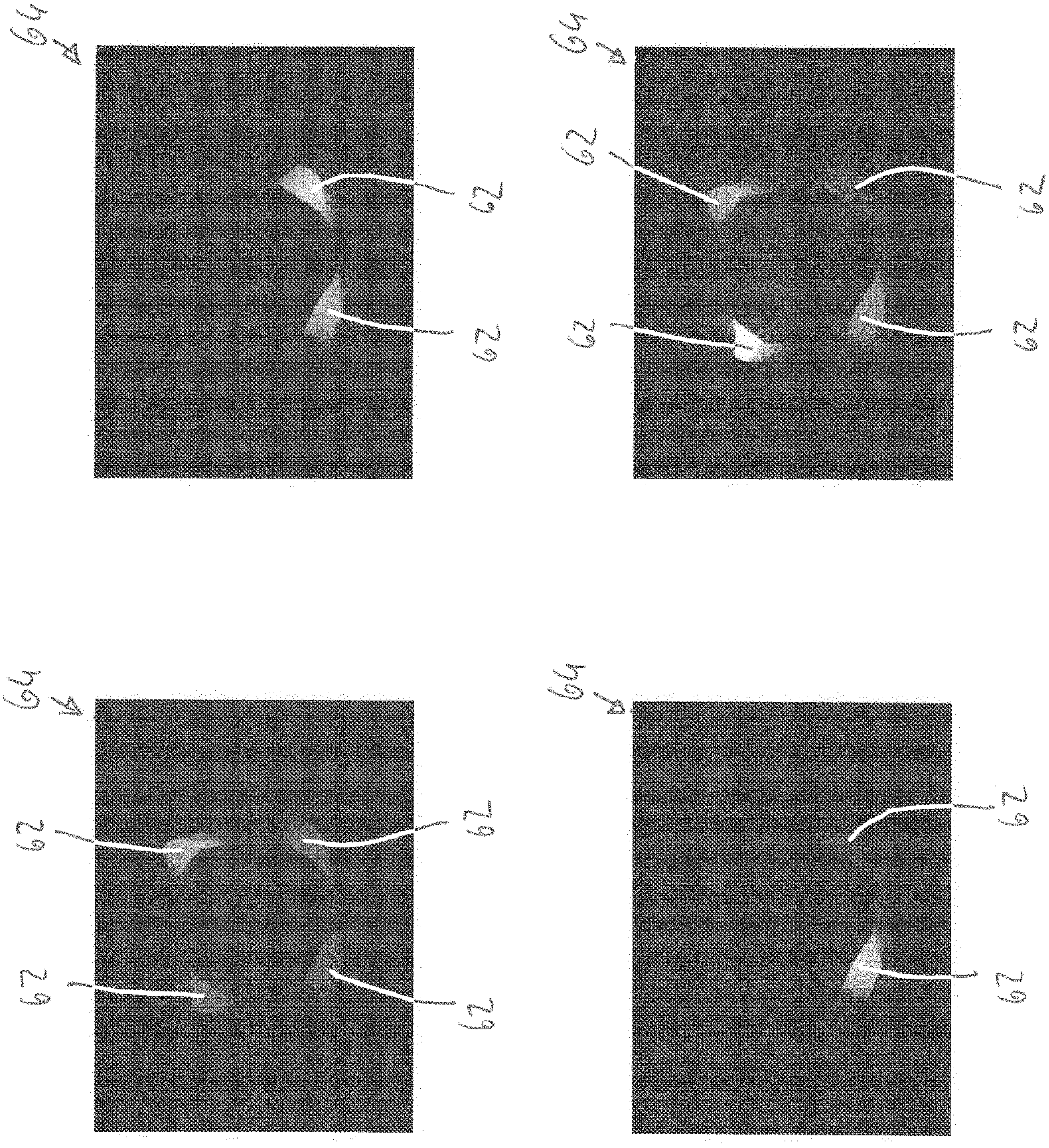
Figure 9:
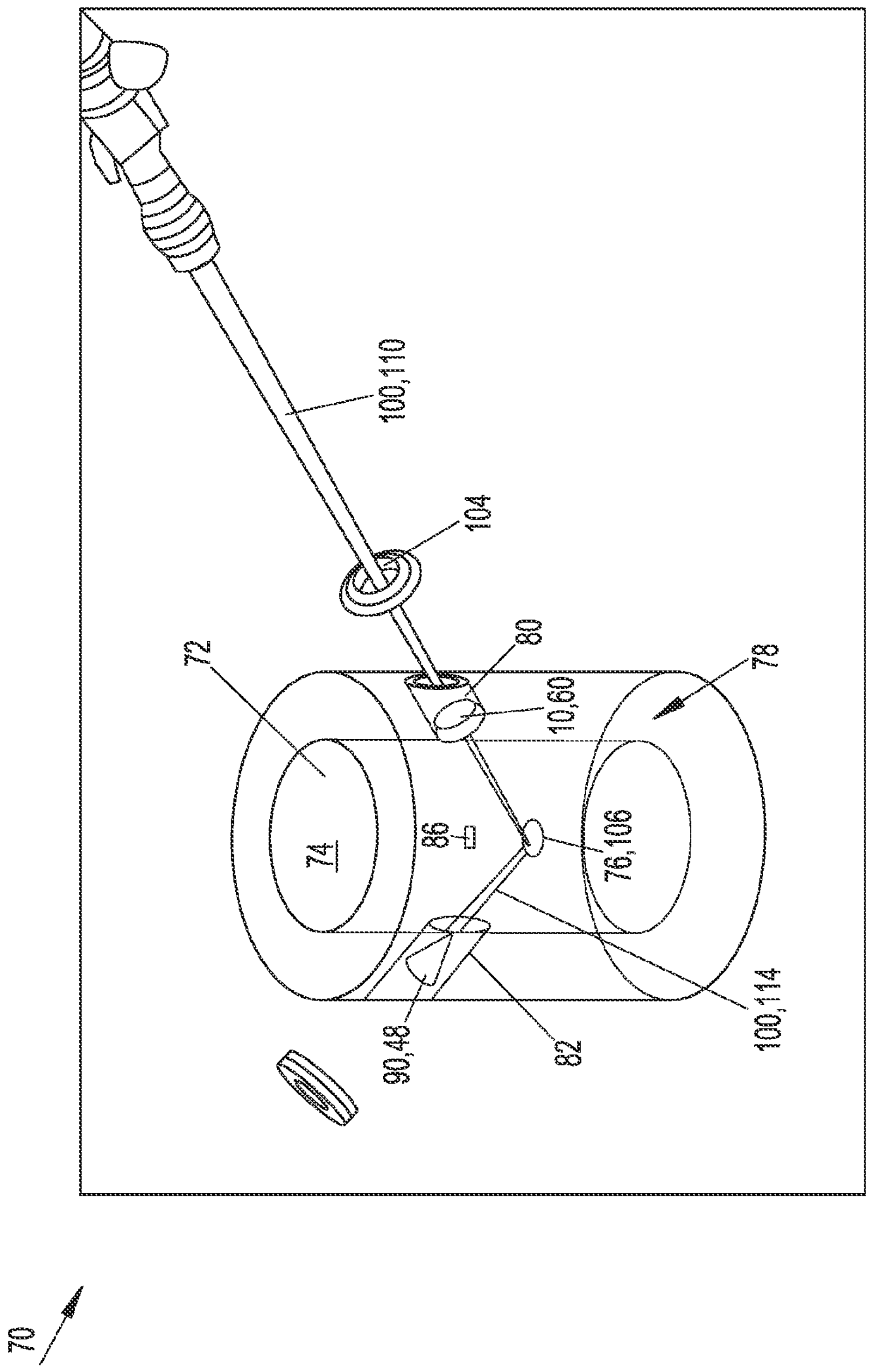
Figure 10:
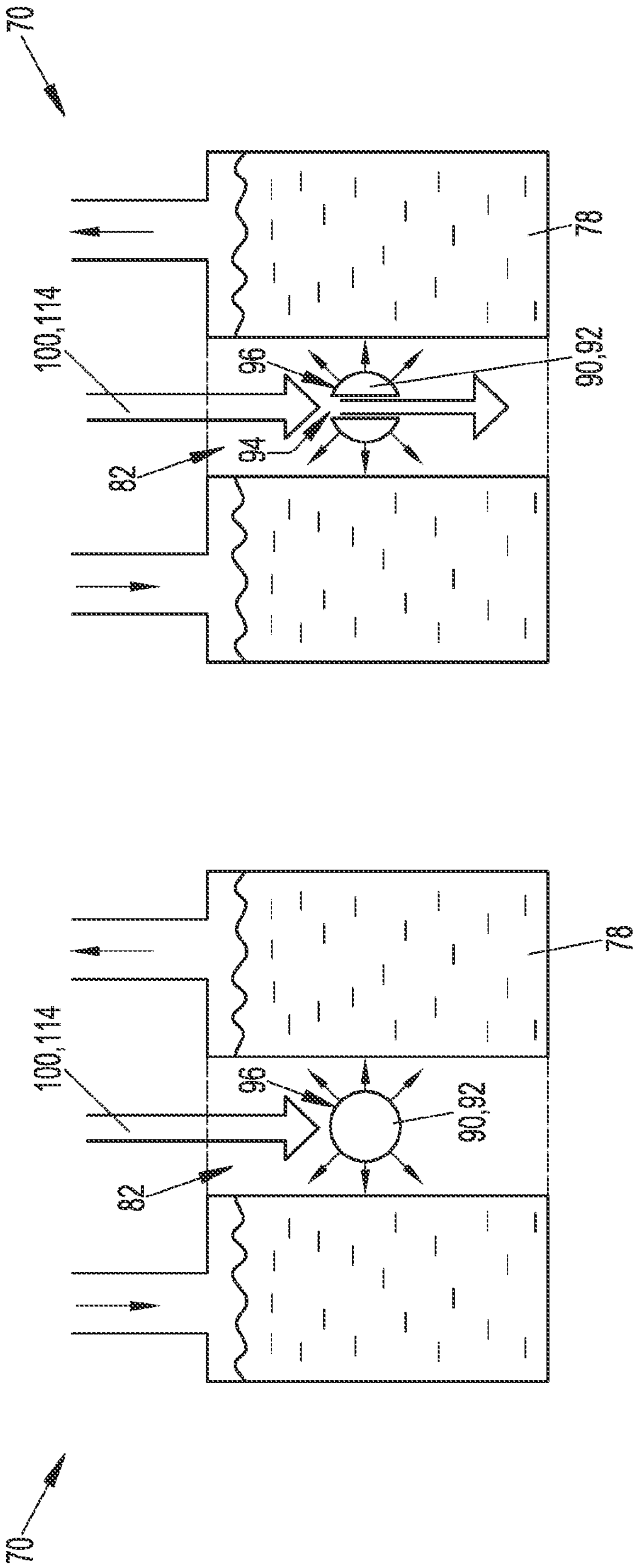
Figure 11:
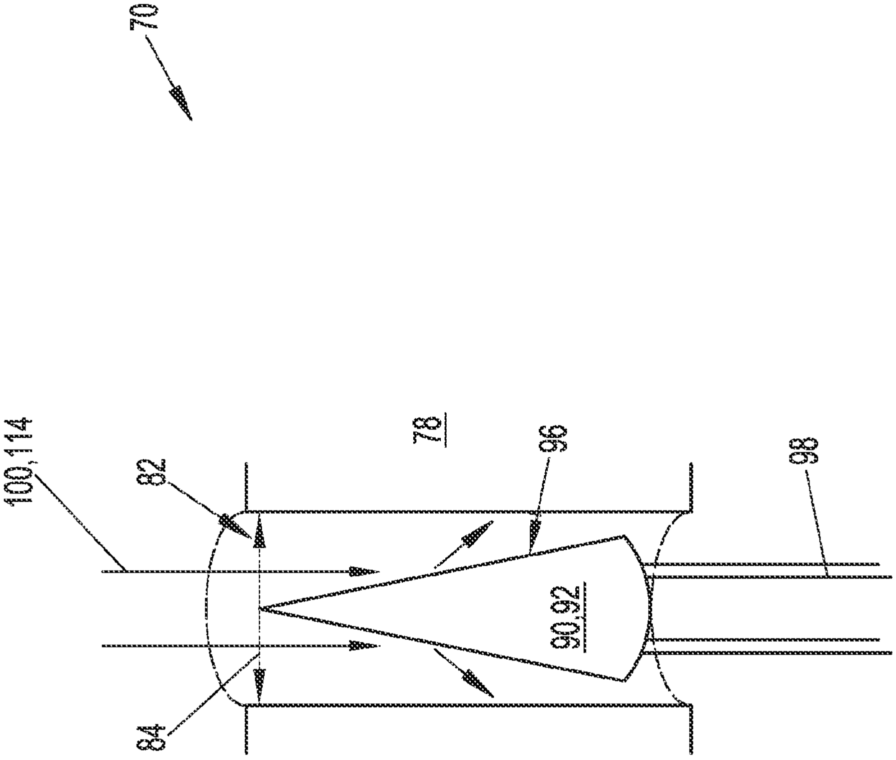
Figure 12:
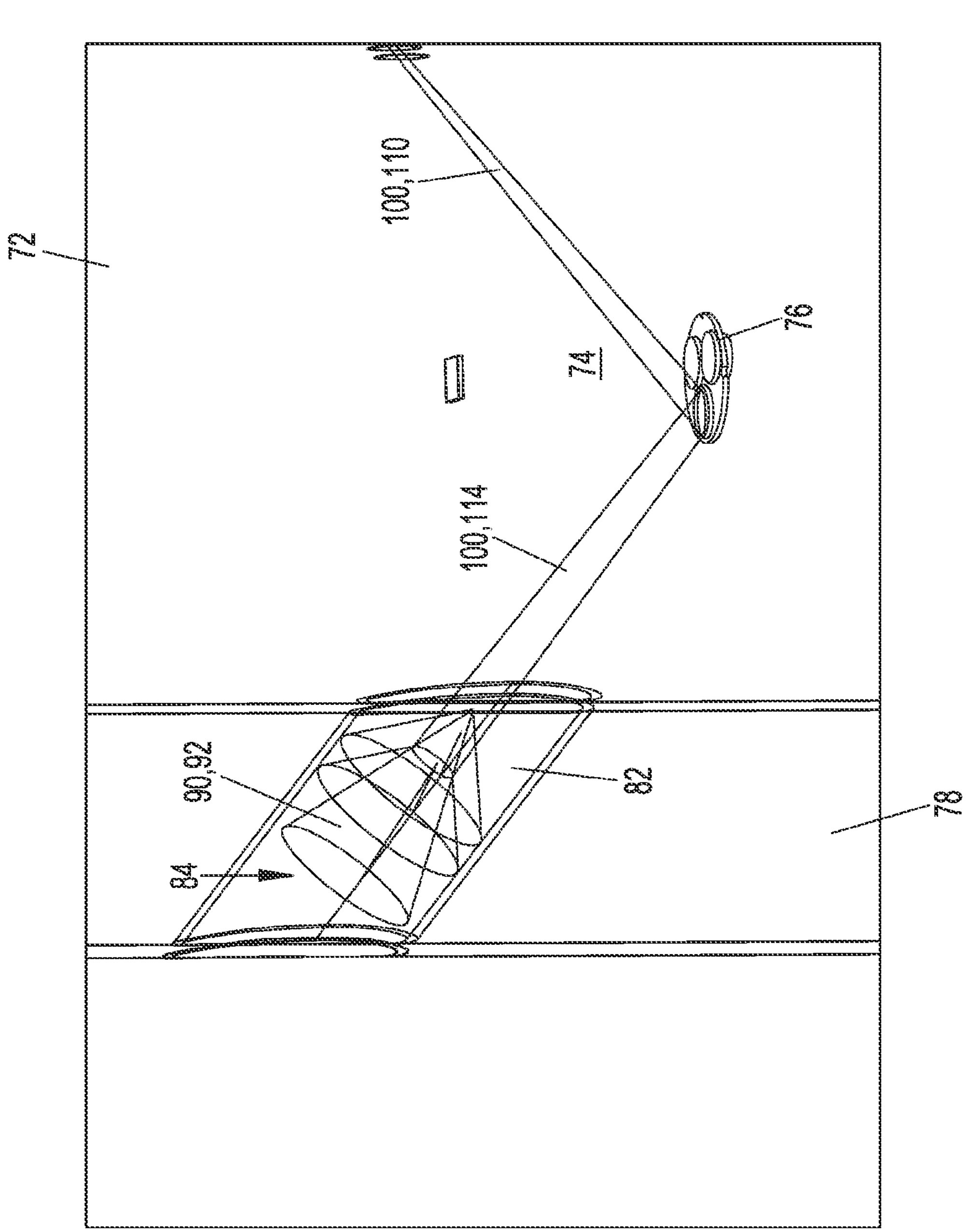
Figure 13:
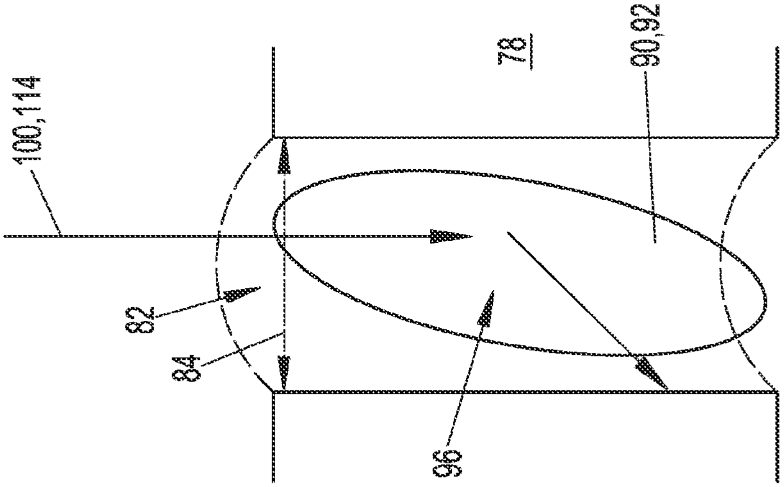
Figure 14:
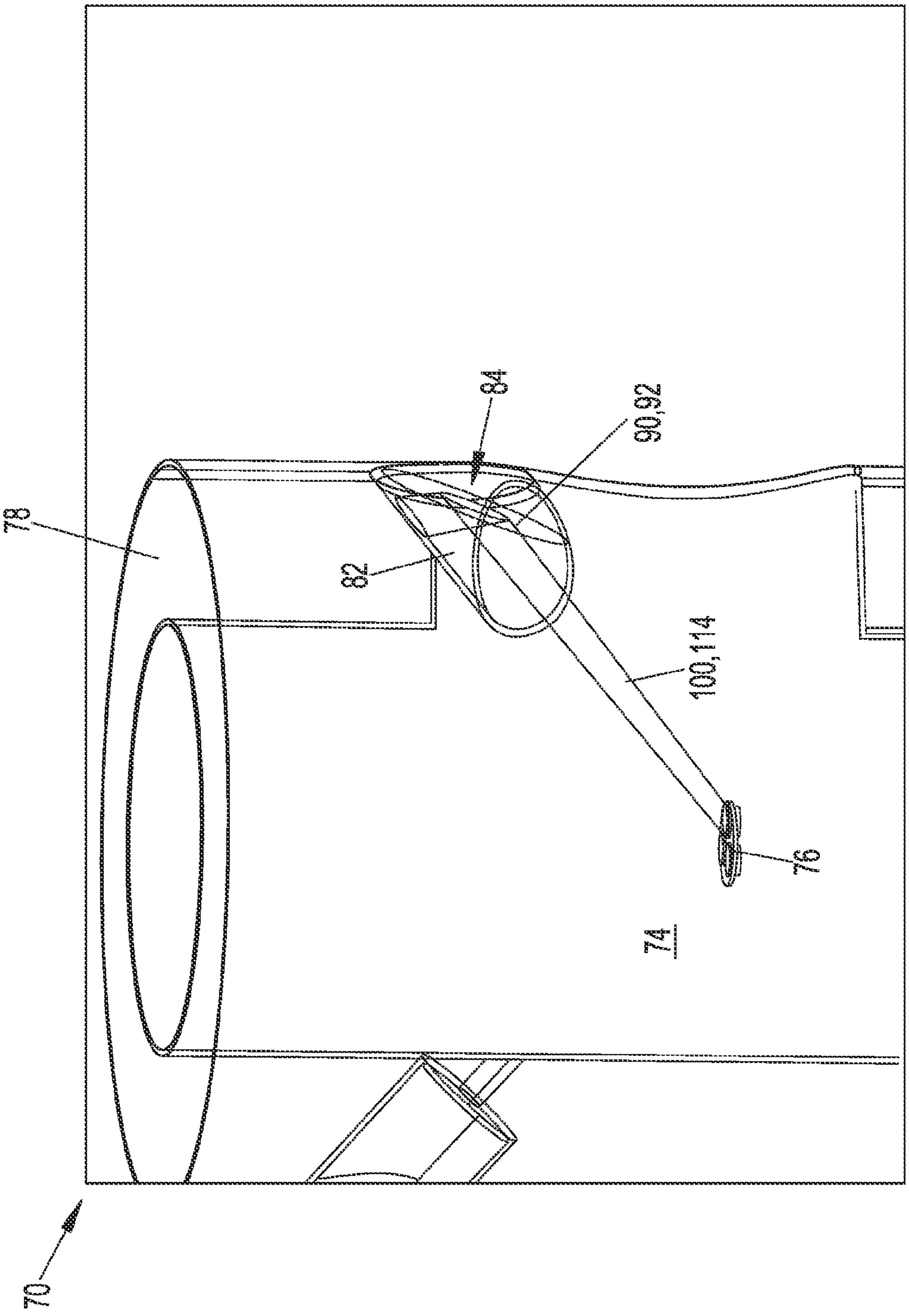

The present invention is further described hereinafter with reference to illustrated embodiments shown in the accompanying drawings. There is shown:

FIG. 1A first embodiment of an aperture according to the present invention,

FIG. 2A second embodiment of an aperture according to the present invention,

FIG. 3A third embodiment of an aperture according to the present invention,

FIG. 4 Different embodiments of an exit surface of an aperture according to the present invention, FIG. 5 An aperture according to the present invention with a shielding aperture, FIG. 6A cross sectional partial view of an aperture according to the present invention, FIG. 7 An aperture according to the present invention with a holding structure, FIG. 8 An aperture according to the present invention in different alignments with respect to the impinging electromagnetic radiation, FIG. 9A system according to the present invention, FIG. 10 Possible embodiments of a dispersing element according to the present invention, FIG. 11 Another possible embodiment of a dispersing element according to the present invention, FIG. 12 The dispersing element of FIG. 11 in a system according to the present invention, FIG. 13 Another possible embodiment of a dispersing element according to the present invention, and FIG. 14 The dispersing element of FIG. 13 in a system according to the present invention, FIG. 1 shows an aperture 10 according to the present invention. The aperture 10 can be used in a system 70 according to the present invention (see FIG. 9). It is placed in the path of an impinging electromagnetic radiation 100, preferably essentially perpendicular to the impinging direction 110 of the electromagnetic radiation 100. Preferably, the electromagnetic radiation 100 comprises a wavelength between 1 nm and 20 μm, whereby the electromagnetic radiation 100 can be provided as a laser, especially an infrared laser, in particular a laser with a wavelength of 1030 nm. Essentially, the aperture 10 comprises an aperture opening 40 and hence can be used defining the size of the beam of the electromagnetic radiation 100, in particular perpendicular to its impinging direction 110.

As exemplarily depicted in FIG. 1, the aperture 10 comprises an aperture body 20 made of a body material 22 transparent for the electromagnetic radiation 100. For instance, the body material 22 may comprise sapphire, in particular, the aperture body 20 as a whole is made of sapphire. The aperture body 20 preferably is shaped with a larger extent perpendicular to the impinging direction 110 than along the impinging direction 110, resulting in an essentially disc-like and/or platelike form of the aperture body 20 and the aperture 10, respectively. With respect to the impinging direction 110 of the electromagnetic radiation 100, the aperture body is limited by a facing surface 24 facing the electromagnetic radiation 100 and an averted surface 28 opposite to the facing surface 24, whereby in particular the facing surface 24 and the averted surface 28 can be flat and preferably oriented parallel to each other. The above-mentioned aperture opening 40 continuously extends between a facing orifice 42 in the facing surface 24 and an averted orifice 44 in the averted surface 28. Hence, electromagnetic radiation 100 can travel through the aperture opening 40 without interaction with the body material 22 of the aperture body 20 of the aperture 10 according to the present invention.

According to the present invention, the facing orifice 42 is surrounded by a refraction section 26 of the facing surface 24. Similar, the averted orifice 44 is surrounded by a reflection section 30 of the averted surface 28. Both, the refraction section 26 and the reflection section 30, respectively, are inclined inward into the aperture body 20, whereby the refraction section 26 is inclined by an angle α 120 with respect to the impinging direction 110, and the reflection section 30 is inclined by an angle β 122 with respect to the impinging direction 110. Preferably, both the angle α 120 and the angle β 122, respectively, are larger than 45° and smaller than 90°. Further, the refraction section 26 and/or the reflection section 30 can be shaped as circular areas around the facing orifice 42 and/or the averted orifice 44, respectively. Preferably and as shown in FIG. 1, the refraction section 26 and the reflection section 30 are shaped as truncated cones.

By comprising the inclined refraction section 26 and the inclined reflection section 30, an aperture 10 according to the present invention can provide the following feature. Due to the body material 22 of the aperture body 20 being transparent to the respective electromagnetic radiation 100, which in most of the cases additionally comprises a refractive index larger than the atmosphere surrounding the aperture 10, impinging electromagnetic radiation 100 is refracted at the refraction section 26 surrounding the facing orifice 42 of the aperture opening 40 by an angle ε 126 with respect to the normal to the refraction section 26. The small part of the impinging electromagnetic radiation 100 reflected at the refraction section 26 as surface reflection 102 comprises a direction different to the impinging direction 110 due to the angle α 120 of the refraction section 26. The amount of electromagnetic radiation 100 reflected at the refraction section 26 as surface reflection 102 can be minimized by providing an anti-refection coating 32 on the refraction section 26.

Further, the electromagnetic radiation 100 refracted at the refraction section 26 into the aperture body 20 is subsequently reflected at the reflection section 30 in a reflection direction 112, preferably in a reflection direction 112 perpendicular to the impinging direction 110. In particular, the angle α 120 and the angle β 122, in the embodiment depicted in FIG. 1 additionally also a cone height 128 of the truncated cones of the refraction section 26 and the reflection section 30, respectively, can be chosen such that the reflection of the electromagnetic radiation 100 at the reflection section 30 is total. To provide the respective sizes of the angle α 120, the angle β 122 and the cone heights 128, respectively, the aperture opening 40 can comprise a middle section 46, connecting the facing orifice 42 and the averted orifice 44 of the aperture opening 40. As for instance realized in the embodiment depicted in FIG. 1, this middle section 46 can be shaped as a cylindrical middle section 46, whereby in particular a central axis 48 of the cylindrical middle section 46 is aligned to the impinging direction 110. The aforementioned requirements for an internal total reflection of the electromagnetic radiation 100 on the reflection surface with respect to the angle α 120, the angle β 122 and the cone heights 128, can therefore be fulfilled independent of a distance between the facing surface 24 and the averted surface 28 of the aperture body 20. In addition, the averted surface 28, especially including the reflection section 30, and the facing surface 24, except the refraction section 26, can be coated with a total-reflection coating 34. This allows defining the difference and ratio, respectively, of the refractive indices responsible and needed for the internal total reflection of the electromagnetic radiation 100 within the aperture body 20 (see also FIG. 6).

Distanced to the aperture opening 40, the aperture body 20 comprises an exit surface 36 connecting the facing surface 24 and the averted surface 28. Especially, the exit surface 36 can be arranged at a rim 38 of the aperture body 20. The electromagnetic radiation 100, reflected, preferably totally reflected, within the aperture body 20 in a reflection direction 112, leaves the aperture 10 through the exit surface 36 and can, for instance in a system 70 according to the present invention (see FIG. 9), be directed in direction of a cooling shroud 78 of the system 70 to dissipate the energy of the electromagnetic radiation 100.

In summary, electromagnetic radiation 100 impinging on the aperture 10 according to the invention travels unhindered through the aperture opening 40, wherein electromagnetic radiation 100 impinging on the aperture body 20 at the refraction section 26 is refracted into the body material 22 of the aperture body 20 and subsequently internally reflected on the reflection section 30 of the averted surface 28 away from the original impinging direction 110 in a reflection direction 112. An especially effective forming of the beam of the electromagnetic radiation 100 by the aperture 10 according to the invention can therefore be provided. In addition, the electromagnetic radiation 100 besides the central beam is guided away from the original impinging direction 110 and can be absorbed somewhere else, preferably in suitable deposition areas such as a cooling shroud 78 (see FIG. 9).

Figure 2:
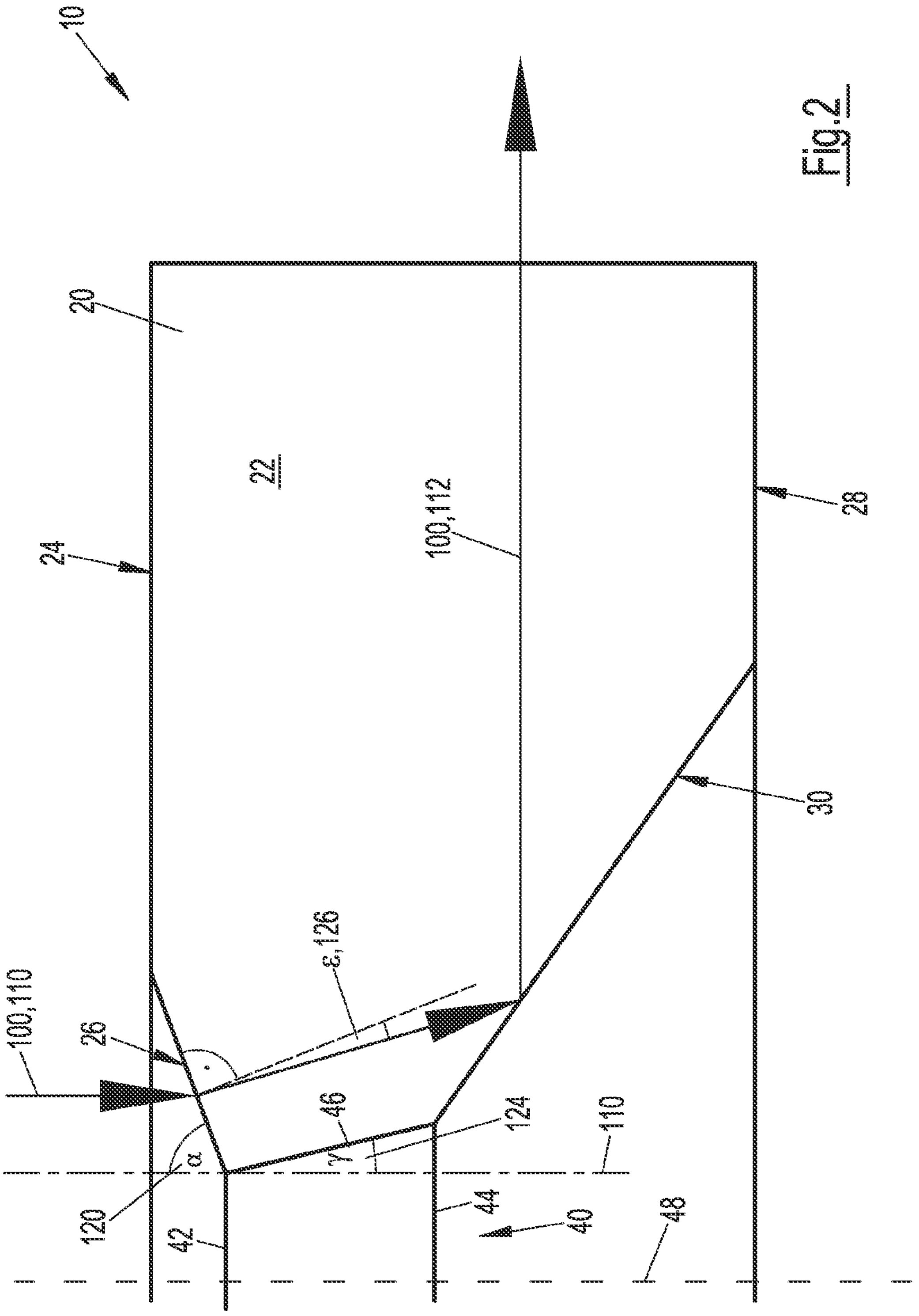

FIG. 2 shows another possible embodiment of an aperture 10 according to the present invention in a partial sectional view. This embodiment shown in FIG. 2 differs from the embodiment depicted in FIG. 1 especially by the middle section 46 of the aperture opening 40. All other parts of this embodiment of an aperture 10 according to the present invention shown in FIG. 2 are similar to the respective ones depicted in FIG. 1 and it is hereby referenced to the respective description above.

In the embodiment of the aperture 10 according to the present invention depicted in FIG. 2, the middle section 46 is formed as a truncated cone connecting the facing orifice 42 in the refraction section 26 and the averted orifice 44 in the reflection section 30. The middle section 46 comprises an opening angle $\gamma$ 124 with respect to the impinging direction 110, whereby the middle section 46 opens up in direction of the averted orifice 44, which is therefore larger than the facing orifice 42. Further, a central axis 48 of the truncated conical middle section 46 is aligned to the impinging direction 110. In the special embodiment of the middle section 46 shown in FIG. 2, the opening angle $\gamma$ 124 is smaller than 90° minus a sum of the opening angle $\alpha$ 120 and the angle $\varepsilon$ 126 of electromagnetic radiation 100 refracted at the refraction section 26. In other words, the angle $\gamma$ 124 is chosen such that electromagnetic radiation 100 with the impinging direction 110 refracted at the refraction section 26 into the aperture body 20 cannot reach a side surface of the truncated conical middle section 46. Also an impingement of the electromagnetic radiation 100 traveling along the impinging direction 100 through the aperture opening 40, especially the facing orifice 42 of the aperture opening 40, onto the side surface of the truncated conical middle section 46 can be excluded by geometry.

Figure 3:
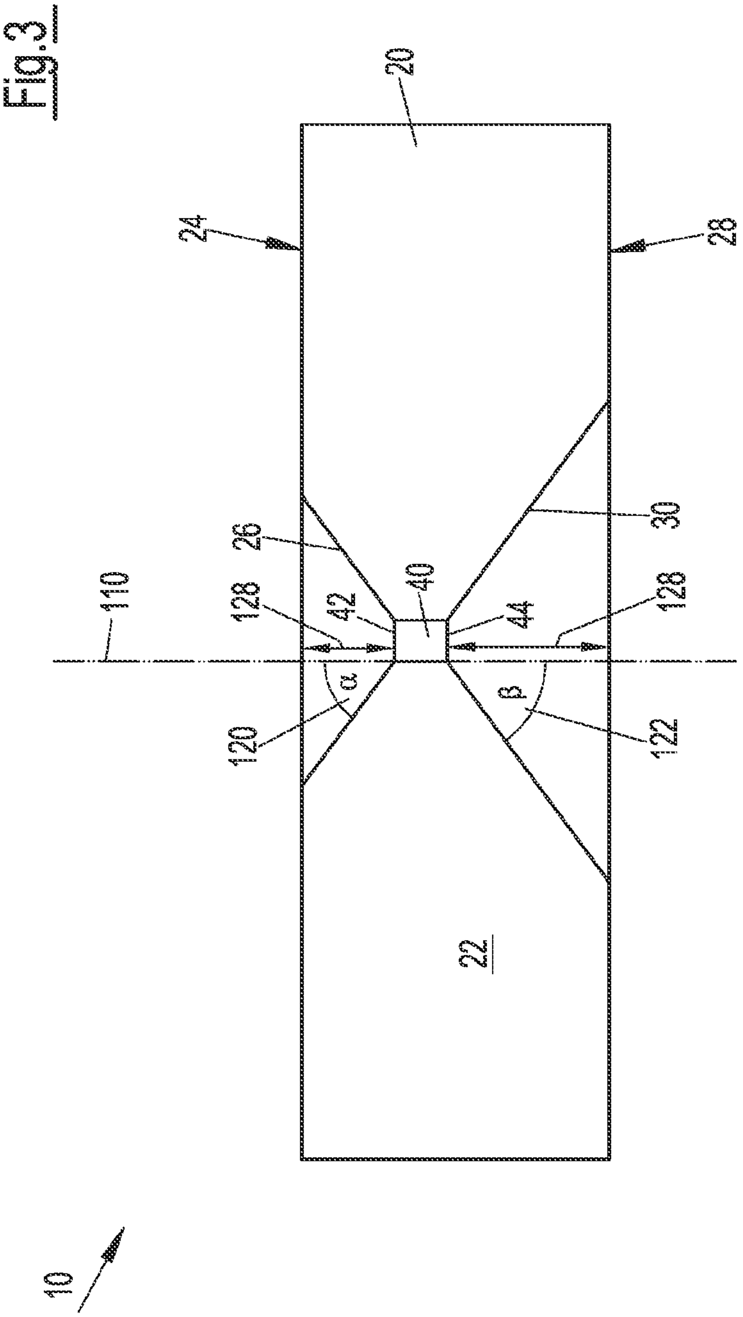

FIG. 3 shows another possible embodiment of an aperture 10 according to the present invention in a partial sectional view. This embodiment shown in FIG. 3 also comprises a cylindrical middle section 46 as part of the aperture opening 40, but differs from the embodiment depicted in FIG. 1 especially by that the angle $\alpha$ 120 and the angle $\beta$ 122 are of the same size. All remaining parts of this embodiment of FIG. 3 are similar to the respective ones depicted in FIG. 1 and it is hereby referenced to the respective description above. The construction of the angle $\alpha$ 120 and the angle $\beta$ 122 comprising the same size allows for instance using the same grinding tool to provide both the refraction section 26 in the facing surface 24 and the reflection section 30 in the averted surface 28. The production of an aperture according to the invention can therefore be provided more easily.

The partial sectional views of two embodiments of apertures 10 according to the present invention depicted in FIG. 4 are focused on the exit surfaces 36 of the respective aperture bodies 20. In both embodiments, the respective exit surface 36 is located at a rim 38 of the aperture body 20 and connects the facing surface 24 with the averted surface 28. Electromagnetic radiation 100 travelling within the body material 22 of the aperture body 20 in a reflection direction 112 is coupled out of the aperture body 20 at the respective exit surface 36.

According to the embodiment of the aperture 10 according to the present invention depicted in the upper part of FIG. 4, the exit surface 36 is a plane surface tilted with respect to both the impinging direction 110 and the reflection direction 112, respectively. Two possible paths of electromagnetic radiation 100 are shown, one with total internal reflection at the exit surface 36, the other with refraction and outcoupling at the exit surface 36. During operation, the wavelength of the electromagnetic radiation and the refraction indices of the body material and its surrounding determine, which of these possibilities is present. In both cases, a reflection of the electromagnetic radiation back on its exact path, and as a result back into the laser source, can be avoided. Stability problems of the laser source caused by back scattered electromagnetic radiation can therefore be prohibited. Further, the above described outcoupling of the electromagnetic radiation at the exit surface with refraction and/or internal reflection leads to a dispersion of the electromagnetic radiation 100 and spreads the energy of the electromagnetic radiation 100 onto a larger area. A dissipation of this energy can therefore be provided.

The lower part of FIG. 4 shows another possible embodiment of the aperture 10 according to the present invention, in which the exit surface 36 comprises a concave shape for a dispersive outcoupling of the electromagnetic radiation 100 out of the aperture body 20. Especially by providing a concave exit surface 36 this outcoupling of the electromagnetic radiation 100 out of the aperture body 20 is a dispersive one. As described above, this allows spreading the energy of the electromagnetic radiation 100 onto a larger area and therefore the spatial energy density of the electromagnetic radiation 100 is diminished. Damage caused by this electromagnetic radiation 100 can therefore be prohibited and/or the energy deposited by the electromagnetic radiation 100 can be removed more easily.

An aperture 10 according to the present invention can be used to define electromagnetic radiation 100 with an impinging direction 110, which itself is used to evaporate and/or sublimate a source material. To prevent a deposition of this evaporated and/or sublimated source material onto the aperture 10, especially onto the averted surface 28 of the aperture body 20 made of body material 22, an aperture 10 according to the present invention can comprise a preferably opaque shielding aperture 50, see FIG. 5. The shielding aperture 50 comprises a central opening 52 with at least the size of the facing orifice 42 and is arranged at the averted surface 28 such that the central opening 52 is aligned to the aperture opening 40 of the aperture body 20. Hence, with with respect to the impinging direction 110 the shielding aperture 50 is arranged after the aperture 10. Source material evaporated and/or sublimated by the electromagnetic radiation 100 is deposited on the shielding aperture 50 in a deposit layer 54 and cannot reach the averted surface 28 with the refraction section 30, not to mention the facing surface 24 with the refraction section 26, of the aperture body 20 of the aperture 10. An influence of deposited source material, especially on the ability of the aperture 10 according to the invention to internally totally reflect electromagnetic radiation 100, can therefore be prohibited.

Alternatively or additionally and as depicted in FIG. 6, the aperture body 20 of an aperture 10 according to the present invention can comprise a total-reflection coating 34, for instance provided as layer on the reflection section 30 and the averted surface 28. As the constraints for an internal total reflection of the electromagnetic radiation 100 into its reflection direction 112 depend on the ratio of the refraction indices n1 of the body material 22 and n2 of the total-reflection coating 34, an additional deposit layer 34 cannot influence this internal total reflection, independent of the refraction index n3 of this deposit layer 34. Hence, the total-reflection coating 34 can provide similar advantages as the shielding aperture 50 described with respect to FIG. 5.

FIGS. 7 and 8 show a preferred embodiment of an aperture 10 according to the present invention. For the general features of an aperture 10 according to the present invention please refer to the FIGS. 1 to 6. In this embodiment, especially shown on the left side of FIG. 7, the aperture 10 comprises a holding structure 60. As depicted, the holding structure 60 can comprise four preferably metal reception sections 62, each of them receipting a corner of the aperture body 20. The corners themselves are located at the outer rim 38 of the aperture body 20 and are spaced equally, both with respect to the aperture opening 40 and to each other, respectively. Further, the holding structure 60 comprises a sensor element 64, for instance a heat seeking camera, and an actuator 66 for a relative movement of the aperture body 20 with respect to the impinging electromagnetic radiation 100 (see for instance FIGS. 1 to 3).

Especially and as described in the following, the sensor element 64 can be used to detect a misalignment of the aperture 10 with respect to the impinging electromagnetic radiation 100, and based on these measurements, the actuator 66 can be used to correct the detected alignment error.

For this, in a first step a) of a method according to the present invention, the reception sections 62 are monitored by the sensor element 64. The electromagnetic radiation 100 impinging on the aperture body 20 outside of the aperture opening is refracted and reflected within the aperture body 20 and finally reaches the outer rim 38 and hence the reception sections 62. The reception sections 62 absorb the electromagnetic energy and are heated up according to the amount of absorbed energy. As the reception sections 62 are located equally distanced to the aperture opening 40 and to each other, a comparison of the measurements and especially a determination of a temperature difference of the reception sections 62 finally allows to determine an alignment and/or misalignment of the aperture 10 with respect to the impinging electromagnetic radiation 100 (steps b) and c), respectively, of a method according to the present invention). Based on the determined misalignment, the actuator 66 can be used to realign the aperture 10 according to the present invention.

In the right side of FIG. 7, a well aligned aperture 10 is shown. Each reception section 62 shows as measurement of the sensor element 64 essentially the same measurement result.

Possible misalignments of the aperture 10 according to the present invention are shown in FIG. 8. The brighter the reception section 62 is depicted in the measurement results of the sensor element 64 shown in the 4 subfigures of FIG. 8, the more the beam of the impinging electromagnetic radiation 100 is misaligned in direction to this particular reception section 62. In the upper left picture of FIG. 8, the beam is misaligned in direction to the upper right reception section 62, in the lower left picture in direction to the lower left reception section 62. The upper right picture of FIG. 8 shows a misalignment in direction to both lower reception sections 62, whereby the lower right picture of FIG. 8 shows a slight misalignment of the beam of impinging electromagnetic radiation 100 to the upper left reception section 62.

FIG. 9 shows a system 70 for applying electromagnetic radiation 100 onto a source material supported by a source holder 76. The electromagnetic radiation 100 is provided by a source of electromagnetic radiation 100 outside of a vacuum vessel 72 of the system 70. Source material can be evaporated and/or sublimated by applying the electromagnetic radiation 100 and subsequently deposited, for instance onto a target 86. An especially precise deposition of source material, both in composition and thickness, can thereby be provided.

The system 70 comprises the aforementioned vacuum vessel 72, which essentially confines a system volume 74 wherein the source holder 76 is arranged. In the system volume 74, an atmosphere suitable and/or necessary for the material to be deposited on the target can be contained. Further, the vacuum vessel 72 comprises a cooling shroud 78 at least partly surrounding the system volume 74.

In the exemplary system 70 shown in FIG. 9, the wall of the vacuum vessel 72 is identical to the respective wall of the cooling shroud 78. In other embodiments of a system 70, there can be a vacuum vessel 72 and a cooling shroud 78, each comprising a distinct wall, whereby these walls can even be spaced from each other for a further reduction of thermal conductivity. The cooling shroud 78 allows cooling the system volume 74, for instance to reach lower internal pressures in the system volume 74. The cooling shroud 78 preferably is adapted to be used with a liquid coolant like water or liquid nitrogen. Liquid coolants are especially suitable because of their high heat capacity. Further, the liquid coolant can be pumped through the cooling shroud 78 and therefore an energy deposit from electromagnetic radiation 100 into the cooling shroud 78 can be easily transported out of the system 70 according to the present invention.

In addition, the cooling shroud 78 can be used to absorb energy of the electromagnetic radiation 100 not used for the evaporation and/or sublimation of the source material. For this purpose, the system 70 comprises an aperture feedthrough 80 for coupling of the electromagnetic radiation 100 into the system volume 74 and a dispersion feedthrough 82 for coupling electromagnetic radiation 100 scattered on the source material in the source holder 76 out of the system volume 74, both of them extending through the cooling shroud 78.

In the aperture feedthrough 80, an aperture 10 (see FIGS. 1 to 8) according to the present invention is arranged using a holding structure 60 for defining a cross section of the beam of electromagnetic radiation 100 perpendicular of its impinging direction 110. Electromagnetic radiation 100 filtered out by the aperture 10 is guided within the aperture 10 preferably perpendicular to the impinging direction 110 into the cooling shroud 78. In addition, the aperture 10, in particular the aperture body comprises a size perpendicular to the impinging direction 110 of the electromagnetic radiation 100 such that the aperture 10, in particular the aperture body 20, covers at least a solid angle of the coupling window 104 as seen from the radiation target 106. Electromagnetic radiation 100 scattered back along the impinging direction 110 as well as source material evaporated and/or sublimated as radiation target 106 at the source holder 76 is thereby stopped by the aperture 10 and cannot reach and subsequently damage the coupling window 104.

Further, a dispersing element 90 is arranged using an arranging structure 98 in the dispersing feedthrough 82 to disperse electromagnetic radiation 100 scattered at the source material in a scattering direction 114 at least partly in direction of the cooling shroud 78.

FIG. 10 shows the basic principle of the functionality of the dispersing element 90 according to the present invention. The dispersing element 90 comprises a dispersing body 92 arranged within the dispersion feedthrough 82 in the cooling shroud 78 of a system 70 according to the present invention. On the left side of FIG. 10, a dispersion element 90 with a solid dispersion body 92 is shown. The embodiment shown on the right side of FIG. 10 comprises a dispersion body 92 with a central passage opening 94, allowing a small part of the scattered electromagnetic radiation 100 to transverse the dispersing element 90 for further use. In both embodiments, electromagnetic radiation 100, scattered at a source material in the system 70 in a scattering direction 114, impinges on the dispersion surface 96 of the dispersion body 92 and is deflected and/or distributed and/or absorbed and subsequently re-emitted. As the dispersion element 90 is arranged well within the dispersion feedthrough 82 of the cooling shroud 78, this dispersed electromagnetic radiation 100 is directed into the cooling shroud 78. Absorption of the energy of the electromagnetic radiation 100 by the cooling shroud 78, preferably the cooling liquid within the cooling shroud 78, can therefore be provided.

In FIGS. 11 and 12, a possible embodiment of a dispersing element 90 according to the present invention is shown. FIG. 11 is focused on the dispersing element 90 itself, FIG. 12 on its arrangement within a system 70 according to the present invention. FIG. 12 also shows the vacuum vessel 72 surrounding the system volume 74 and the impinging electromagnetic radiation 100 in its impinging direction 110. In this embodiment, the dispersing body 92 is of a conical shape. Further, the dispersing body 92 is aligned to the scattering direction 114 of the electromagnetic radiation 100 and points in direction to the source material on which the electromagnetic radiation 110 is scattered. In addition, the dispersion body 92 essentially fills a cross section 84 of the dispersion feedthrough 82 in the cooling shroud 78 of the system 70 according to the present invention. Hence all of the electromagnetic radiation 100 scattered in the scattering direction 114 at the source material in the source holder 76 is dispersed by the dispersion surface 96 of the dispersing element 90 into the cooling shroud 78. As the dispersing body 92 is axially symmetric, the electromagnetic radiation 100 is essentially also dispersed by the dispersing element 90 in an axial symmetric way. An especially even distribution of the electromagnetic radiation 100 dispersed by the dispersing element 90 can therefore be provided. An arranging structure allows an especially reversible arrangement of the dispersing element 90 in the dispersion feedthrough 82.

FIGS. 13 and 14 show an alternative embodiment of a dispersing element 90 according to the present invention is shown. Again, FIG. 13 is focused on the dispersing element 90 itself, FIG. 14 on its arrangement within a system 70 according to the present invention, whereby FIG. 14 also shows the vacuum vessel 72 surrounding the system volume 74. The dispersing body 92 of this special embodiment of a dispersing element 90 according to the present invention comprises a flat elliptical dispersion surface 96. In addition, this dispersion surface 96 is tilted with respect to the scattering direction 114 of the electromagnetic radiation 100 scattered at the source material. Further, the dispersion body 92 and the dispersion surface 96, respectively, essentially fills a cross section 84 of the dispersion feedthrough 82 in the cooling shroud 78. Hence and similar to the embodiment described with respect to FIGS. 11 and 12, all of the electromagnetic radiation 100 scattered in the scattering direction 114 at the source material is dispersed on the dispersion surface 96 of the dispersing element 90 into the cooling shroud 78. In contrast to the embodiment described with respect to FIGS. 11 and 12, as the dispersion surface 96 is flat, the electromagnetic radiation 100 coming from the source material is redirected in the half space defined by the surface of the flat dispersion surface 96. This allows redirecting the scattered electromagnetic radiation 100 into a specific part of the cooling shroud 78 if necessary, for instance and as depicted in FIG. 14, if the volume of the cooling shroud 78 is limited in a specific direction by another feedthrough.

REFERENCE LIST

10 Aperture
20 Aperture body
22 Body material
24 Facing surface
26 Refraction section
28 Averted surface
30 Reflection section
32 Anti-reflection coating
34 Total-reflection coating
36 Exit surface
38 Rim
40 Aperture opening
42 Facing orifice
44 Averted orifice
46 Middle section
48 Central axis
50 Shielding aperture
52 Central opening
54 Deposit layer
60 Holding structure
62 Reception section
64 Sensor element
66 Actuator
70 System
72 Vacuum vessel
74 System volume
76 Source holder
78 Cooling shroud
80 Aperture feedthrough
82 Dispersion feedthrough
84 Cross section
86 Target
90 Dispersing element
92 Dispersing body
94 Passage opening
96 Dispersion surface
98 Arranging structure
100 Electromagnetic radiation
102 Surface reflection
104 Coupling window
106 Radiation target 110 Impinging direction
112 Reflection direction
114 Scattering direction
120 Angle α
122 Angle β
124 Angle γ
126 Angle ε
128 Cone height

The invention claimed is:

1. An aperture for an electromagnetic radiation, the aperture comprising:

an aperture body consists of a body material transparent for the electromagnetic radiation, the aperture body limited with respect to an impinging direction of the electromagnetic radiation by a facing surface facing the electromagnetic radiation and an averted surface opposite to the facing surface, wherein the aperture body comprises an aperture opening continuously extending between a facing orifice in the facing surface and an averted orifice in the averted surface, and wherein the facing orifice is surrounded by a refraction section, the refraction section being inclined inward with respect to the facing surface into the aperture body by an angle α with respect to the impinging direction, and wherein the averted orifice is surrounded by a reflection section, the reflection section being inclined inward with respect to the averted surface into the aperture body by an angle β with respect to the impinging direction, wherein the angle α and the angle β are adapted such that an electromagnetic radiation refracted into the aperture body through the refraction section is internally totally reflected on the reflection section.

2. The aperture according to claim 1, wherein the angle α and/or the angle β are larger than 45° and smaller than 90°.

3. The aperture according to claim 1, wherein the angle α and the angle β are of the same size.

4. The aperture according to claim 1, wherein the electromagnetic radiation internally totally reflected on the reflection section comprises a reflection direction at least essentially perpendicular to the impinging direction.

5. The aperture according to claim 1, wherein the refraction section is shaped as a circular area around the facing orifice and/or the reflection section is shaped as a circular area around the averted orifice.

6. The aperture according to claim 5, wherein the refraction section and/or the reflection section is shaped as a truncated cone, and the angle α and a cone height of the refraction section along the impinging direction and the angle β and a cone height of the reflection section along the impinging direction are chosen such that all electromagnetic radiation refracted at the refraction section is internally totally reflected at the reflection section.

7. The aperture according to claim 1, wherein the aperture opening comprises a cylindrical middle section connecting the facing orifice in the refraction section and the averted orifice in the reflection section.

8. The aperture according to claim 1, wherein the aperture opening comprises a truncated conical middle section connecting the facing orifice in the refraction section and the averted orifice in the reflection section, wherein the averted orifice is larger than the facing orifice.

9. The aperture according to claim 8, wherein the truncated conical middle section comprises an opening angle γ, whereby the opening angle γ is smaller than 90° minus a sum of the angle α and an angle ε of electromagnetic radiation refracted at the refraction section.

10. The aperture according to claim 1, wherein at least the refraction section is coated with an anti-reflection coating.

11. The aperture according to claim 1, wherein at least the reflection section comprises a total-reflection coating, whereby a refractive index of the total-reflection coating is smaller than a refractive index of the body material.

12. The aperture according to claim 1, further comprising:

a shielding aperture with a central opening is arranged at the averted surface, the central opening comprises at least a size of the facing orifice and is aligned to the aperture opening of the aperture body.

13. The aperture according to claim 1, wherein the aperture body comprises an exit surface connecting the facing surface and the averted surface spaced to the aperture opening, wherein the exit surface comprises a concave and/or convex shape for a dispersive outcoupling of the electromagnetic radiation out of the aperture body.

14. The aperture according to claim 1, wherein the aperture body consists of sapphire.

15. The aperture according to claim 1, wherein the aperture body is adapted for a laser beam as electromagnetic radiation.

16. The aperture according to claim 1, further comprising:

a holding structure for an arrangement of the aperture body in a path of the electromagnetic radiation when used in a vacuum vessel.

17. The aperture according to claim 16, wherein the holding structure is constructed to arrange the aperture body within the vacuum vessel between a coupling window for coupling the electromagnetic radiation into the vacuum vessel and a radiation target within the vacuum vessel on which the electromagnetic radiation is directed, whereby the aperture comprises a size perpendicular to the impinging direction of the electromagnetic radiation such that the aperture covers at least a solid angle of the coupling window as seen from the radiation target.

18. The aperture according to claim 16, wherein the holding structure comprises two or more reception sections in a direct contact to an outer rim of the aperture body for fixing the aperture body within the holding structure.

19. The aperture according to claim 18, wherein the two or more reception sections are equally distributed along the outer rim of the aperture body and/or are arranged equally distanced to the aperture opening.

20. The aperture according to claim 19, wherein the outer rim of the aperture body comprises three or more corners equally distanced to the aperture opening and to each other, whereby each of the three or more corners is fixed by a reception section.

21. The aperture according to claim 18, wherein the holding structure comprises at least one sensor element to monitor the two or more reception sections.

22. A system for applying an electromagnetic radiation onto a source material, comprising:

a system volume, a source holder with a source material arranged in the system volume, a source of electromagnetic radiation to be coupled into the system volume for an application onto the source material, a cooling shroud surrounding at least parts of the system volume, an aperture feedthrough extending through the cooling shroud for coupling of an electromagnetic radiation into the system volume, a dispersion feedthrough extending through the cooling shroud for coupling an electromagnetic radiation reflected by the source material out of the system volume, an aperture according to claim 1 arranged in the aperture feedthrough, and a dispersing element comprising a dispersing body and arranged in the dispersion feedthrough with the dispersing body for at least partly diverting an electromagnetic radiation scattered at the source material in a scattering direction to the cooling shroud.

23. A dispersing element for a system, the system comprising:

a system volume, a source holder with a source material arranged in the system volume, a source of electromagnetic radiation to be coupled into the system volume for an application onto the source material, a cooling shroud comprising a diversion feedthrough surrounding at least parts of the system volume, an aperture feedthrough extending through the cooling shroud for coupling of an electromagnetic radiation into the system volume, a dispersion feedthrough extending through the cooling shroud for coupling an electromagnetic radiation reflected by the source material out of the system volume, an aperture according to claim 1 arranged in the aperture feedthrough, and further wherein the dispersing element comprises a dispersing body and arrangeable in the dispersion feedthrough with the dispersing body for at least partly diverting an electromagnetic radiation scattered at the source material in a scattering direction to the cooling shroud, with the dispersing body for at least partly diverting the electromagnetic radiation scattered on the source material in a scattering direction by a deflection and/or a distribution and/or a combined absorption and re-emission of the electromagnetic radiation, wherein the dispersing element further comprises an arranging structure for a reversible arrangement within the diversion feedthrough of the cooling shroud.

24. The dispersing element according to claim 23, wherein the dispersing body at least essentially fills a cross section of the dispersion feedthrough perpendicular to the scattering direction of the electromagnetic radiation scattered at the source material.

25. A method for aligning an aperture according to claim 21, wherein a beam of electromagnetic radiation is impinging on the aperture, comprising the following steps:

a) monitoring the two or more reception sections by the at least one sensor element, b) comparing monitoring results for the two or more reception sections determined in step a); and c) determining an alignment of the aperture with respect to the beam of electromagnetic radiation based on a result of a comparison in step b).

* * * * *